(12) United States Patent
Mahajan et al.

(10) Patent No.: US 12,198,355 B2
(45) Date of Patent: Jan. 14, 2025

(54) LIGHT SIGNAL ASSESSMENT RECEIVER SYSTEMS AND METHODS

(71) Applicant: Teledyne Scientific & Imaging, LLC, Thousand Oaks, CA (US)

(72) Inventors: Milind P. Mahajan, Thousand Oaks, CA (US); Weiya Zhang, Thousand Oaks, CA (US); John Mansell, Thousand Oaks, CA (US); Bryce Murray, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 198 days.

(21) Appl. No.: 17/879,715

(22) Filed: Aug. 2, 2022

(65) Prior Publication Data
US 2024/0046484 A1    Feb. 8, 2024

(51) Int. Cl.
| | | |
|---|---|---|
| *G06T 7/60* | (2017.01) | |
| *G01S 7/481* | (2006.01) | |
| *G01S 17/89* | (2020.01) | |
| *G06T 7/246* | (2017.01) | |
| *G06T 7/73* | (2017.01) | |
| *H04N 23/72* | (2023.01) | |

(52) U.S. Cl.
CPC ............ *G06T 7/246* (2017.01); *G01S 7/4816* (2013.01); *G01S 17/89* (2013.01); *G06T 7/60* (2013.01); *G06T 7/73* (2017.01); *H04N 23/72* (2023.01); *G06T 2207/10048* (2013.01)

(58) Field of Classification Search
None
See application file for complete search history.

(56) References Cited

U.S. PATENT DOCUMENTS

| | | |
|---|---|---|
| 6,785,032 B1 | 8/2004 | Le Mere |
| 7,521,664 B2 | 4/2009 | David |
| 9,671,489 B1 | 6/2017 | Aina et al. |
| 2016/0069743 A1* | 3/2016 | McQuilkin ............ A22B 5/007 356/416 |
| 2019/0342480 A1* | 11/2019 | Kostrzewa ............... H04N 5/33 |
| 2022/0260415 A1* | 8/2022 | Thibout ................. G01J 1/4257 |

FOREIGN PATENT DOCUMENTS

| | | | | |
|---|---|---|---|---|
| EP | 1569007 | | 8/2005 | |
| EP | 2906159 | | 3/2017 | |
| WO | WO-2014056543 | A1 * | 4/2014 | ............ A61F 9/022 |
| WO | WO 2015/195746 | | 12/2015 | |
| WO | WO 2021/009221 | | 1/2021 | |

* cited by examiner

*Primary Examiner* — Samuel D Fereja
(74) *Attorney, Agent, or Firm* — Haynes and Boone, LLP

(57) ABSTRACT

Techniques for facilitating light signal assessment receiver systems and methods are provided. In one example, a light signal assessment device includes a light signal detection device including a filter array, a detector array, and a measurement device. The filter array is configured to filter a light signal incident on the filter array. The detector array is configured to receive the filtered light signal and generate a light signal detection image based on the filtered light signal. The measurement device is configured to determine a characteristic associated with the light signal based on the light signal detection image. The assessment device further includes a logic device configured to generate an output based on the characteristic. Related methods and systems are also provided.

20 Claims, 8 Drawing Sheets

LIGHT SIGNAL ASSESSMENT RECEIVER SYSTEMS AND METHODS

TECHNICAL FIELD

One or more embodiments relate generally to light signal detection and more particularly, for example, to light signal assessment receiver systems and methods.

BACKGROUND

Light signals and detection thereof may be utilized in various applications, such as in surveillance applications. As an example, a light source may be present in a scene. Dependent on application, a location of the light source and/or a location of an object that reflects the light signal may be determined based on detection of the light signal by an appropriate detector.

SUMMARY

In one or more embodiments, a light signal assessment device includes a light signal detection device. The light signal detection device includes a filter array configured to filter a light signal incident on the filter array to obtain a filtered light signal. The light signal detection device further includes a detector array configured to receive the filtered light signal and generate a light signal detection image based on the filtered light signal. The light signal detection device further includes a measurement device configured to determine a characteristic associated with the light signal based on the light signal detection image. The light signal assessment device further includes a logic device configured to generate an output based on the characteristic.

In one or more embodiments, a method includes filtering, by a filter array, a light signal incident on the filter array to obtain a filtered light signal. The method further includes generating, by a detector array, a light signal detection image based on the filtered light signal. The method further includes determining a characteristic associated with the light signal based on the light signal detection image. The method further includes generating an output based on the characteristic.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
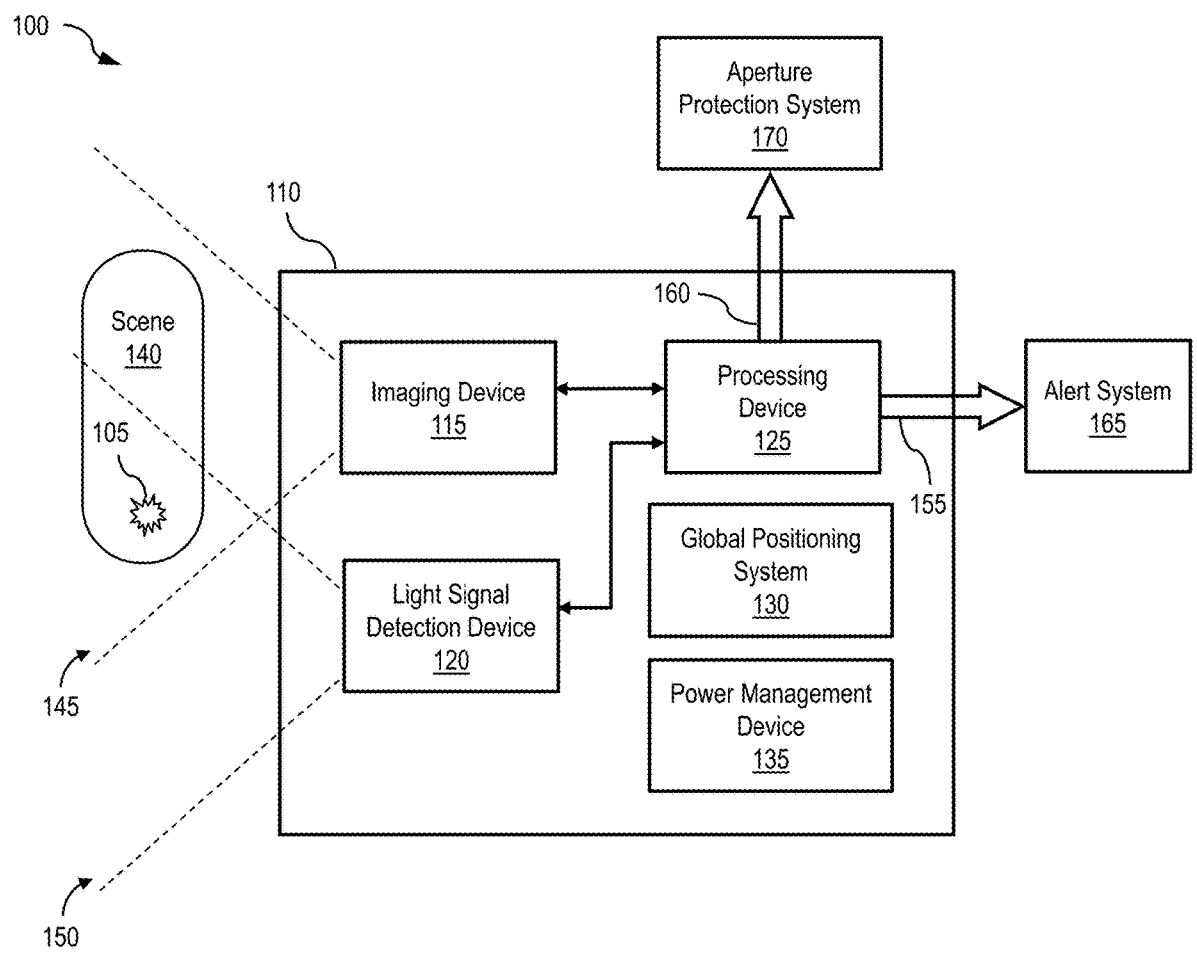
FIG. 1 illustrates an example system for facilitating light signal assessment and associated alert and mitigation in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate light signal assessment and, in some embodiments, associated alert and/or aperture protection. In some embodiments, a light signal assessment device includes a light signal detection and a processing device. The light signal detection device may include a filter array to filter a light signal incident on the filter array and a detector array to receive the filtered light signal from the filter array and generate pixel values based on the filtered light signal. Each pixel value may be generated by a respective detector/sensor of the detector array. The pixel values generated by the light signal detection device form a light signal detection image. The light signal detection device may include a measurement device to determine one or more characteristics associated with the light signal based on the pixel values generated by the detector array. By way of non-limiting examples, the characteristics associated with the light signal include a wavelength(s), a direction (e.g., direction of arrival), a location, and a strength associated with the light signal. As an example, dependent on application, a location of the light source and/or a location of an object that reflects the light signal with strength and wavelength of the light signal may be determined based on detection of the light signal by an appropriate detector.

The processing device may generate an output based on the light signal detection image and/or a characteristic(s) of the light signal determined by the light signal detection device. In some embodiments, the output may include one or more assessment values (e.g., threat location, threat level, threat categorization). In this regard, the processing device may assess the light signal captured/received by the light signal detection device to determine one or more assessment values. In one aspect, the assessment values may be based at least in part on a comparison of a power associated with the light signal and power thresholds (e.g., application- and/or wavelength-dependent power thresholds). For example, for laser light signals, the thresholds may be based on the American National Standard for Safe Use of Lasers (ANSI Z136.1), which provides maximum permissible exposure (MPE) thresholds for ocular exposure.

In some embodiments, the output of the processing device includes an output image generated based on the light signal detection image, a characteristic(s) of the light signal determined by the light signal detection device, and/or an assessment value associated with the light signal. In some aspects, the output image includes the light signal detection image captured by the light signal detection device with one or more overlays on the light signal detection image. As such, the output image may be referred to as an annotated image. Each overlay may be indicative of a characteristic and/or an assessment value associated with the light signal. Overlay of information associated with light signals onto light signal detection images captured by the light signal detection device may facilitate detection of the light signals and determination of associated characteristics, such as wavelength and strength, in the light signal detection images (e.g., via visual inspection of the images).

In some embodiments, the light signal assessment device also includes an imaging device. The imaging device can capture an image associated with a scene (e.g., a real-world scene). In an aspect, the image may be referred to as a scene image or a context image. The imaging device and the light signal detection device may each capture image data (e.g., in the form of electromagnetic radiation) within their respective field of views (FOVs). To facilitate detection and imaging of light signals, the imaging device and the light signal detection device are positioned and oriented (e.g., arranged to have a pointing direction) such their FOVs overlap. In some cases, the imaging device and the light signal detection device may be co-boresighted and mounted adjacent to each other to minimize parallax. In some cases, the imaging device and the light signal detection device may collectively be referred to as a threat sensor or a threat sensing device. In some aspects, the light signal detection device and the imaging device may each include an image detector circuit and a readout circuit. The image detector circuit may capture (e.g., detect, sense) visible-light radiation, infrared radiation, and/or radiation of other portions of the electromagnetic (EM) spectrum. The readout circuit may read out pixel values from the image detector circuit. In some cases, the processing device may trigger the imaging device to capture an image that encompasses the light signal when the processing device determines the light signal to be potentially harmful. Otherwise, the imaging device may be in a standby mode (e.g., to conserve power) when no light signal is detected by the light signal detection device.

The processing device may generate an output based on the image data from the imaging device and the light signal detection device. In some embodiments, the output may include a combined image. The processing device may combine (e.g., perform sensor fusion on) the image data from the imaging device and the light signal detection device to obtain combined images. In some aspects, a combined image may include an image captured by the imaging device with one or more overlays on the image. Each overlay may be indicative of a characteristic and/or an assessment value associated with the light signal. Overlay of information associated with light signals onto images may facilitate detection of the light signals in the images (e.g., via visual inspection).

Light signal assessment systems and methods (e.g., output(s) generated therefrom) according to various embodiments herein may be used to facilitate alert and aperture protection (e.g., by users such as law enforcement, first responders, etc.). In this regard, proliferation of accessibility and affordable sources of light, such as lasers (e.g., diode lasers, diode pumped solid state lasers) and dazzlers, has created a threat to apertures such as human eyes and sensors, since such sources of light may blind (e.g., temporarily blind) the eyes, and/or damage and/or saturate the sensors. For example, lasers are available with diverse wavelengths that span the visible-light and/or infrared (IR) spectral bands and may have several hundred milliwatts of laser power, which is generally sufficient to dazzle and/or damage human eyes. Alerts and other information generated by the light signal assessment may facilitate deployment of countermeasures and/or initiate follow up action/investigation as desired.

In this regard, in some embodiments, the processing device may transmit outputs (e.g., assessment values, annotated images, combined images) and/or other data (e.g., characteristics measured by the light signal detection device) to one or more systems, such as an alert system and an aperture protection system. In some cases, data transmitted between the processing device, the alert system, and the aperture protection device may be encrypted. For example, the processing device may communicate with alert systems, aperture protection systems, and/or other systems authenticated to the light signal assessment device, and/or vice versa. The alert system may include one or more alert devices for providing an alert associated with a light signal. An alert device may provide a tactile alert (e.g., vibration), an audio alert, and/or a visual alert. For example, an alert device may include a display device to display to a user an output image (e.g., as a visual alert) generated by the processing device. The aperture protection system may include one or more devices to protect an aperture(s) (e.g., human eye(s), sensor aperture(s)) from a light signal determined by the processing device to be a potentially harmful light signal, while minimizing impairing of the user's view and/or interfering with the user's normal operation. In this regard, the aperture protection system may selectively pass light to or block light from the aperture(s).

Using various embodiments, a light signal assessment device may be included in various systems, such as a laser threat warning system. Such assessments may allow providing of detailed data to facilitate generation of threat alerts (e.g., audible, visual, and/or tactile alerts) and/or mitigation of (e.g., aperture protection from) any light signal-related threats. Such systems may be implemented with a ruggedized, low cost, modular, lightweight, and/or compact design. In some aspects, a system may be mounted to a wearable device (e.g., headband, helmet, visor) worn by an individual (e.g., a first responder) that benefits from light signal (e.g., laser) assessment. The light signal assessment device may have a light signal detection device co-packaged with a scene-capture imaging device. The light signal assessment device may be implemented using low cost components, such as low cost silicon sensors for its light signal detection device (e.g., for detecting light signals within the visible-light and/or near IR (NIR) spectra) and/or low power processor(s). (e.g., for performing sensor fusion and threat categorization). In some cases, a mechanical packaging of the light signal assessment device may be compliant with appropriate standards and waterproof (e.g., to an IP67 level) dependent on application. The light signal assessment device may be implemented according to a modular design that supports scaling up with additional light signal assessment devices to increase a detection area and increase probability of detecting threat beams.

Referring now to the drawings, FIG. 1 illustrates an example system 100 for facilitating light signal assessment (e.g., laser threat assessment) and associated alert and mitigation (e.g., aperture protection) in accordance with one or more embodiments of the present disclosure. The system 100 may be implemented in and/or referred to as a network environment or simply an environment. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 100 includes a light source 105 embedded in a scene 140 and a light signal assessment device 110. The light source 105 may generally be any component capable of providing a light signal. In some cases, the light signal may be a laser light signal. The light source 105 may be associated with a ground-based object/source, a naval-based object/source, an aerial-based object/source, and/or generally any object/source that can emit, reflect, and/or otherwise provide a light signal. In one case, the light source 105 may be an emitter of a light signal, such as a laser or a dazzler. In one case, the light pulse may be an object (e.g., building, vehicle) that reflects a light signal. Although the scene 140 in FIG. 1 encompasses a single light source, a scene may include no light sources or multiple light sources. In some embodiments, the light signal assessment device 110 may be used to detect and assess light signals having visible-light wavelengths (e.g., viewable by human eyes) and/or more covert wavelengths, such as infrared wavelengths (e.g., mid-wave infrared wavelengths, long-wave infrared wavelengths).

The light signal assessment device 110 includes an imaging device 115, a light signal detection device 120 (e.g., also referred to as a light signal characterization device), a processing device 125 (e.g., also referred to as a logic device), a global positioning system (GPS) 130, and a power management device 135. In some implementations of a light signal assessment device, the imaging device 115, the GPS 130, and/or other components may be optional and/or additional components not explicitly shown in the light signal assessment device 110 may be provided by a light signal assessment device. For example, in some cases, the GPS 130 may be an external GPS communicatively coupled to the light signal assessment device 110 alternative to or in addition to an internal GPS. In an embodiment, the light signal assessment device 110 may be referred to as a light signal assessment receiver unit, a light signal warning receiver unit, a receiver unit, or variants thereof (e.g., light signal assessment receiver).

The power management device 135 may be connected to the imaging device 115, the light signal detection device 120, the processing device 125, and the GPS 130 to supply power as needed for operation of the imaging device 115, the light signal detection device 120, the processing device 125, and the GPS 130. In some cases, the power management device 135 may include one or more power sources (e.g., rechargeable batteries, non-rechargeable batteries) and associated circuitry for controlling power provided by the power source(s) to the imaging device 115, the light signal detection device 120, and the processing device 125. In some cases, alternatively or in addition, the power management device 135 may have associated circuitry for controlling power provided to the light signal assessment device 110 by one or more power sources external to the light signal assessment device 110 and/or power provided from the light signal assessment device 110 to one or more external devices.

The imaging device 115, the light signal detection device 120, the processing device 125, the GPS 130, and the power management device 135 may be capable of communicating with each other via wired and/or wireless communication. Communication may be based on one or more wireless communication technologies, such as Wi-Fi (IEEE 802.11ac, 802.11ad, 802.11ax, etc.), cellular (3G, 4G, 5G, etc.), Bluetooth™, etc. and/or one or more wired communication technologies, such as Ethernet, Universal Serial Bus (USB), etc. In some cases, the imaging device 115, the light signal detection device 120, and/or the processing device 125 may communicate with each other via a wired and/or a wireless network. The network(s) may include a local area network (LAN), a wide area network (WAN), an Intranet, or a network of networks (e.g., the Internet). The GPS 130 may provide location (e.g., latitude, longitude, and/or altitude) and timing services for the imaging device 115, the light signal detection device 120, the processing device 125, and/or the power management device 135.

The connections (e.g., wired, wireless) shown in FIG. 1 between the imaging device 115, the light signal detection device 120, the processing device 125, the GPS 130, and the power management device 135 are provided by way of non-limiting example. In some cases, the connections may include intra-chip, inter-chip (e.g., within the same device or between different devices), and/or inter-device connections. For example, although the imaging device 115, the light signal detection device 120, the processing device 125, the GPS 130, and the power management device 135 are depicted in FIG. 1 as separate devices connected (e.g., wire connected, wirelessly connected) to other devices and with their own enclosures (e.g., represented as rectangles), in some cases the imaging device 115, the light signal detection device 120, the processing device 125, the GPS 130, and the power management device 135 may be connected via intra-chip connections (e.g., traces). Additional, fewer, and/or different connections may be provided. Furthermore, although the processing device 125 is shown as a separate component from the imaging device 115, the light signal detection device 120, the GPS 130, and the power management device 135, the processing device 125 or a portion thereof may be part of (e.g., integrated in) the imaging device 115, the light signal detection device 120, the GPS 130, and/or the power management device 135.

The imaging device 115 can capture/generate an image associated with the scene 140 (e.g., a real world scene) within an FOV 145 of the imaging device 115. In an aspect, the imaging device 115 may be referred to as a scene-capture imaging device, a scene-capture camera, a scene camera, or a context camera. A resolution of images captured by the imaging device 115 may be dependent on application. In some cases, the imaging device 115 captures high resolution (HR) images. An image may be referred to as a frame or an image frame. In an embodiment, the imaging device 115 may include an image detector circuit and a readout circuit (e.g., an ROIC). In some aspects, the image detector circuit may capture (e.g., detect, sense) visible-light radiation and/or infrared radiation. In some cases, for a given image, the imaging device 115 may store a time (e.g., using a timestamp) associated with capture of the image by the imaging device 115.

To capture an image, the image detector circuit may detect image data (e.g., in the form of EM radiation) associated with the scene 140 and generate pixel values of the image based on the image data. In some cases, the image detector circuit may include an array of detectors that can detect EM radiation, convert the detected EM radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, a microbolometer, or other detector capable of converting EM radiation (e.g., of a certain wavelength) of a pixel value.

The readout circuit may be utilized as an interface between the image detector circuit that detects the image data and a processing circuit that processes the detected image data as read out by the readout circuit. The readout circuit may read out the pixel values generated by the image detector circuit. An integration time for a detector may correspond to an amount of time that incoming radiation striking the detector is converted to electrons that are stored prior to a signal being read (e.g., in an integration capacitor that may be opened or shorted). A frame rate may refer to the rate (e.g., images per second) at which images are detected in a sequence by the image detector circuit and provided to the processing circuit by the readout circuit. A frame time is the inverse of the frame rate and provides a time between providing of each image to the processing circuit by the readout circuit. An integration time (e.g., also referred to as an integration period) is a fraction of the frame time. In some cases, the frame time may include the integration time and a readout time (e.g., associated with readout of the pixel values by the readout circuit).

The light signal detection device 120 can detect (e.g., capture, sense) light signals within an FOV 150 of the light signal detection device 120. In this regard, the light signal detection device 120 can detect light signals incident on detectors of the light signal detection device 120 and having a wavelength within one or more wavebands (e.g., also referred to as spectral bands or simply bands) of the light signal detection device 120. The light signal detection device 120 may include optics (e.g., optical components such as lenses, mirrors, beam splitters, etc.) positioned upstream of the detectors to direct light from the optics to the detectors. In some aspects, the light signal detection device 120 may detect light signals with wavelengths in the infrared range and/or the visible-light range. For example, in some aspects, the light signal detection device 120 may be sensitive to (e.g., better detect) purple light signals (e.g., purple laser light), blue light signals, yellow light signals, NIR light signals, mid-wave infrared (MWIR) light signals, long-wave IR (LWIR) light signals, and/or any desired visible-light and/or IR wavelengths. In some embodiments, the light signal detection device 120 may include a multi-spectral imager capable of detecting light signals having wavelength components within one or more wavebands. An example of a multi-spectral imager is described with respect to FIG. 3.

At any instance, the light signal detection device 120 may detect no light signals, a single incident light signals, or multiple incident light signals (e.g., multiple beams). Multiple incident light signals may activate different detectors of the light signal detection device 120 and may be simultaneously measured for assessment. In some cases, tracking algorithms may facilitate tracking (e.g., over time and/or over images in a video) of multiple light signals simultaneously. In some cases, each light signal may be associated with a cluster (e.g., group of pixels), as further described herein. For a given light signal incident on the light signal detection device 120, the light signal detection device 120 may determine characteristics associated with the light signal and generate data indicative of such characteristics (e.g., for transmission to the processing device 125 and/or other device). By way of non-limiting examples, the characteristics may include a wavelength(s) associated with the light signal, a direction(s) of arrival associated with the light signal, and a power/strength (e.g., in Watts) associated with the light signal. In some cases, for a given light signal, the light signal detection device 120 may track (e.g., store) times (e.g., using timestamps) at which the light signal is detected (e.g., received) by the light signal detection device 120.

In some aspects, the light signal detection device 120 may include processing/logic circuitry to determine characteristics associated with a light signal based at least in part on pixel values generated by the light signal detection device 120 in response to the light signal. In an aspect, the processing/logic circuitry of the light signal detection device 120 may be referred to as a light signal measurement device or simply a measurement device. To obtain the pixel values, the detectors (e.g., photodetectors) of the light signal detection device 120 may detect radiation of a certain waveband, convert the detected radiation into electrical signals (e.g., voltages, currents, etc.), and generate the pixel values (e.g., also referred to as pixel count values, count values, or simply counts) based on the electrical signals. In some cases, the detectors may include and/or be coupled to one or more analog-to-digital converters (ADCs) of the light signal detection device 120 that convert the electrical signals to the pixel values.

The light signal detection device 120 may determine (e.g., estimate) a power/strength of the light signal based on the pixel values. As an example, the power associated with a light signal may be determined based on integration of pixel counts or analog-digital units (ADUs) over the light signal (e.g., a spot). Higher pixel values are generally associated with higher light signal power. In an aspect, the light signal detection device 120 may determine the number of pixels where the ADU count exceeds a threshold count value (e.g., also referred to simply at a threshold value and is associated with or indicative of a threshold light signal power). The threshold count value may be wavelength dependent. The light signal detection device 120 may also determine if these pixels form one or more clusters. In an aspect, each cluster is a group of pixels that share boundaries and may be referred to as a group of contiguous pixels. Multiple separate clusters (e.g., clusters having no overlapping pixels) may indicate presence of multiple light sources.

The light signal detection device 120 may determine a centroid associated with each cluster. The centroid may be considered a center point associated with the cluster and may be indicative of a most likely location of a light source whose light signal generated the cluster. In an aspect, for a given cluster, the light signal detection device 120 may determine the centroid based on a weighted average of pixels that form the cluster. The weighted average may place higher weight on pixels that more strongly (e.g., higher intensity) receive the light signal and lower weight on pixels that less strongly receive the light signal.

The light signal detection device 120 may determine a direction of arrival of a light signal that forms a cluster based on a centroid of the cluster, since the centroid may be considered a center point associated with the cluster and may be indicative of a most likely location of a light source whose light signal generated the cluster. In some embodiments, the optics (e.g., one or more lenses) of the light signal detection device 120 may direct a light signal(s) onto the detectors of the light signal detection device 120 based on a direction from which the light signal(s) hits the optics. In this regard, a direction from which an incoming signal hits the optics determines the detector(s) of the light signal detection device 120 that receive the incoming signal as directed by the optics. As such, each detector/pixel of the light signal detection device 120 is associated with a direction of arrival of a light signal.

The light signal detection device 120 may also determine a wavelength component(s) of the light signal based on the pixel values. As an example, the light signal detection device 120 may include an array of filters, where each filter has a corresponding spectral passband. Each filter may correspond to and be proximate to a corresponding detector. When a light signal (or portion thereof) is incident on a filter, the filter performs filtering to provide (e.g., extract from the incident light signal) a filtered light signal having a wavelength component(s) within the passband of the filter. Wavelength components of the light signal that are outside the passband of the filter are attenuated. Since each detector is configured to receive a filtered light signal associated with a certain passband, a substantially zero pixel value indicates a lack of a wavelength component in the incident unfiltered light signal whereas a larger pixel value (e.g., sufficiently larger than zero so as to not be considered noise) is indicative of presence of the wavelength component in the incident unfiltered light signal.

In some embodiments, the light signal detection device 120 may generate images based on components and/or associated operations performed by the image detector circuit and the readout circuit as described with respect to the imaging device 115. In this regard, the light signal detection device 120 may have an image detector circuit and a readout circuit. A frame rate(s) and/or an integration time(s) used by the light signal detection device 120 may be adjustable manually by a user/operator of the light signal detection device 120 and/or autonomously by the light signal assessment device 110 (e.g., in response to a detected light signal(s)). For example, the frame rate(s) and/or the integration time(s) may be adjusted to adjust a dynamic range accommodated by the light signal detection device 120 (e.g., to reduce a likelihood of pixel saturation). As another example, the light signal detection device 120 may take multiple images with substantially different exposure times and/or gains to increase an effective dynamic range and prevent saturation of the pixels.

In some embodiments, the imaging device 115 and the light signal detection device 120 are positioned and oriented (e.g., arranged to have a pointing direction) such that the FOV 145 of the imaging device 115 overlaps the FOV 150 of the light signal detection device 120 to facilitate detection and imaging of light signals. The FOVs 145 and 150 are generally based on an architecture (e.g., size, shape, arrangement of detectors) of a sensor (e.g., detector array) and associated optical components (e.g., the focal length of a lens) used to capture image data. Although the FOVs 145 and 150 are shown as conical FOVs, the FOV 145 and/or the FOV 150 may generally be any shape that can be accommodated by their respective sensors. In some cases, the FOVs 145 and/or 150 may be adjustable (e.g., adjustable manually, electronically, etc.). In some aspects, the imaging device 115 and the light signal detection device 120 may have similar FOVs. In some cases, the imaging device 115 and the light signal detection device 120 may be co-boresighted. In some cases, the imaging device 115 and the light signal detection device 120 may be separate devices (e.g., having no common housing) mounted adjacent to each other to minimize parallax. In some cases, the imaging device 115 and the light signal detection device 120 may be positioned close to each other within a common housing to minimize parallax.

With the FOVs 145 and 150 overlapping, data from the imaging device 115 and the light signal detection device 120 may support resolving a location of a light signal-related threat in the scene 140. As an example, in some implementations, the imaging device 115 and the light signal detection device 120 operating in tandem may support resolving an attacker holding and emitting a light signal from a light source (e.g., laser source) from over a distance of around 200 m from the imaging device 115 and the light signal detection device 120. In such implementations, a threat location accuracy and resolution provided by the imaging device 115 and the light signal detection device 120 are sufficient to identify a suspected attacker, differentiate between separate attackers, and differentiate between a suspected attacker(s) and bystanders.

The processing device 125 may receive data from the imaging device 115 and/or the light signal detection device 120. As provided above, the data from the imaging device 115 may include an image of the scene 140 (e.g., also referred to as a scene image or a context image) at a time at or around when the scene 140 encompasses the light signal 105 and/or other light signal(s) detected by the light signal detection device 120. The data from the light signal detection device 120 may include light signal characteristics including, by way of non-limiting examples, a wavelength(s), a direction(s) of arrival (e.g., an angle of arrival), and a strength associated with each light signal detected by the light signal detection device 120. In some cases, the data from the light signal detection device 120 may include a light signal detection image.

The processing device 125 may assess/categorize (e.g., assign a threat categorization and/or a threat level) each light signal detected by the light signal detection device 120 based on the light signal characteristics from the light signal detection device 120. By assessing/categorizing each light signal, the processing device 125 may determine an assessment value(s) (e.g., a threat categorization and/or a threat level) for association with each light signal. In some aspects, after such assessment/categorization, the processing device 125 may determine whether to trigger an alert (e.g., threat alert) based on such light signal assessment/categorization. The processing device 125 may perform such light signal assessment/categorization for each light signal based on one or more thresholds. In some cases, a single threshold may be used, in which the processing device 125 provides a binary result of either categorizing a light signal as being a potentially harmful light signal or not a potentially harmful light signal. With multiple thresholds, the processing device 125 may associate a potentially harmful light signal with a threat level. In some cases, a number of thresholds and/or threshold values may be customizable by the user. In some cases, such thresholds may be stored in a memory device of or accessible to the processing device 125.

In some cases, the thresholds may include power parameter thresholds (or simply power thresholds). Each power parameter threshold may be associated with a different threat level, with higher power values generally associated with higher threat levels. As an example, the power parameter may be, or may be related to, a power density. The light signal detection device 120 and/or the processing device 125 may determine (e.g., estimate) a power density (e.g., in $W/cm^2$) of the light signal that a target (e.g., an aperture of the target, such as the target's eyes for a human target) of the light signal may be exposed to based on the signal strength measurement from the light signal detection device 120. The processing device 125 may then compare the power density to the power density thresholds, assess/categorize the light signal based on the comparisons, and selectively trigger an alert(s) based on the assessment/categorization. In some applications, a user may utilize the threat levels associated with each light signal and prioritize addressing light sources (e.g., attackers aiming the light sources) according to the relative threat levels.

Different wavelengths may be associated with different thresholds and/or different threat levels. As an example, for a given low power level, light at visible-light wavelengths may be considered less dangerous than light at NIR wavelengths, since the human eye is protected from visible-light wavelengths by an aversion response (e.g., blinking) which limits an effective exposure time whereas NIR wavelengths can focus power on the retina while not triggering an aversion response from a human. A total exposure time may also depend on a pointing jitter and a spot size of the light signal. At higher power levels, the aversion response may not provide much mitigation/protection even for visible-light wavelengths.

In some aspects, thresholds for triggering a threat alert(s) may be determined based on the ANSI Z136.1. ANSI Z136.1 provides MPE thresholds for ocular exposure. In some cases, a comparison of an MPE with a determined power density may be used to trigger alerts. In some cases, for a laser light source, if a range of the laser light source is available, such as through stereo imaging for example, a laser class (e.g., class 2, 3R, 3B, or 4) may be predicted and an associated alert triggered. In some cases, the light signal assessment device 110 may include and/or may be coupled to one or more imaging devices to facilitate such stereo imaging.

The processing device 125 may perform sensor data fusion (e.g., also referred to simply as sensor fusion) of the data from the imaging device 115 and the light signal detection device 120 to obtain a combined image. The combined image may include the scene image with data associated with any detected light signals overlaid thereon. In this regard, the combined image may provide situational awareness by allowing the user to observe/pinpoint the light signal within the scene 140 (e.g., buildings, humans, machinery) that encompasses the light signal from the light source 105. The overlaid data may include textual overlay(s) and/or graphical overlay(s) to provide information and enhance visibility of any detected light signals within the scene. For example, the processing device 125 may generate the overlay(s) and provide (e.g., combine) the overlay(s) with the scene image to obtain the combined image. In some cases, one or more overlays may have a color, size, and/or shape that maximize their respective contrast with respect to the scene. In some cases, the combined image may be displayed to the user (e.g., providing the light signal within the scene 140) to help the user pinpoint an attacker (e.g., the person aiming the light source 105).

In some aspects, during light signal exposure (e.g., laser exposure), while the imaging device 115 may bloom, the imaging device 115 generally captures a number of images in which the blooming is absent (e.g., due to pointing jitter and/or head motion). Such images without bloom may be selected for combining with the overlay(s) and/or displaying to the user (e.g., with or without overlays).

In some embodiments, the imaging device 115 may be operated in a continuous image capture mode or a triggered image capture mode. The continuous image capture mode may also be referred to as a continuous capture mode, continuous imaging mode, or simply a continuous mode. The triggered image capture mode may also be referred to as a triggered capture mode, a triggered imaging mode, a triggered mode, or simply a trigger mode. When operating in the continuous mode, the imaging device 115 is continuously capturing images of the scene 140. In this regard, the imaging device 115 is generally capturing images according to a frame capture rate and independent of whether any light signal is detected by (e.g., incident on) the light signal detection device 120.

When operating in the trigger mode, the imaging device 115 may capture images based on (e.g., in response to) data received from the light signal detection device 120 and/or the processing device 125. In some cases, the data may be a control/trigger signal (e.g., an instruction) for the imaging device 115 to capture images of the scene 140. By capturing images of the scene 140 in response to such a control signal, the images captured by the imaging device 115 have a high likelihood of encompassing the light signal from the light source 105 and/or other light signals. For example, upon receipt of the control signal by the imaging device 115, the imaging device 115 may start an integration period to capture an image and then continue capturing images according to a frame capture rate of the imaging device 115. When the light signal detection device 120 no longer detects a potentially harmful light signal (e.g., as categorized by the processing device 125), the data may be a control signal (e.g., an instruction) for the imaging device 115 to stop capturing images of the scene 140. In this regard, the imaging device 115 may enter a standby state/phase of the trigger mode.

In some embodiments, when the imaging device 115 is set to the standby state during a trigger mode, the processing device 125 may receive data associated with light signals from the light signal detection device 120 and assess the light signals based on the data. When the processing device 125 categorizes one or more light signals as being potentially harmful, the processing device 125 may transmit a control signal to the imaging device 115 to cause the imaging device 115 to capture images of the scene 140. With the imaging device 115 capturing images, the processing device 125 may then receive data from the light signal detection device 120 as well as the imaging device 115. Once the processing device 125 determines that no potentially harmful light signals are in the scene 140, the processing device 125 may transmit a control signal to the imaging device 115 to cause the imaging device 115 to enter the standby state (e.g., to conserve power and/or processing resources of the imaging device 115 and the processing device 125).

In some aspects, a user may manually toggle between operating in the continuous mode or the trigger mode (e.g., based on application, location of the user, remaining battery power of the light signal assessment device 110, and/or other considerations). Such manual toggling may be effectuated by flipping a switch provided by the light signal assessment device 110 and/or on a remote device (e.g., smartphone and/or other device that can communicate with the light signal assessment device 110), pressing and/or holding a button provided by the light signal assessment device 110 and/or on a remote device, etc. In some cases, operation of the imaging device 115 in the trigger mode may allow for significant power savings of the light signal assessment device 110 compared to operation of the imaging device 115 in the continuous mode. For example, in one implementation, for a given battery level of the light signal assessment device 110, a remaining battery life of the light signal assessment device 110 with the imaging device 115 in the trigger mode may be around or over twice as long (e.g., dependent on number of potentially harmful light signals incident on the light signal detection device 120) as a remaining battery life with the imaging device in the continuous mode.

The light signal assessment device 110 includes output device interfaces 155 and 160. The output device interfaces 155 and 160 may enable the light signal assessment device 110 to provide output information. The output device interfaces 155 and 160 may represent wired and/or wireless interfaces. In some embodiments, as shown in FIG. 1, the system 100 also includes an alert system 165 and an aperture protection system 170. The output device interface 155 facilitates communication by the light signal assessment device 110 with the alert system 165. The output device interface 160 facilitates communication by the light signal assessment device 110 with the aperture protection system 170. In this regard, the light signal assessment device 110 may communicate threat details to the alert system 165 and the aperture protection system 170 via a wired link(s) and/or a wireless link(s). In some cases, the GPS 130 may provide location (e.g., latitude, longitude, and/or altitude) and timing services for the imaging device 115, the light signal detection device 120, the processing device 125, the power management device 135, the alert system 165, and/or the aperture protection system 170. In some aspects, a notional reaction time of the light signal assessment device 110 may be in the tens of milliseconds. A reaction time may refer to a time from capturing images from the light signal detection device 120 and the imaging device 115 to completing threat assessment and relaying information to the alert system 165 and/or the aperture protection system 170. The processing device 125 may operate with sufficient reaction time/speed to support a nominal image acquisition rate of the imaging device 115 and the light signal detection device 120.

In some embodiments, the light signal assessment device 110 and the alert system 165 may collectively form a light signal assessment and alert system. In some embodiments, the light signal assessment device 110 and the aperture protection system 170 may collectively form a light signal assessment and aperture protection system. In some embodiments, the light signal assessment device 110, the alert system 165, and the aperture protection system 170 may collectively form a light signal assessment, alert, and aperture protection system. In other embodiments, the alert system 165 and/or the aperture protection system 170 may be optional. In some embodiments, a mechanical packaging of a system that includes the light signal assessment device 110 may be compliant with appropriate standards and waterproof (e.g., to an IP67 level) dependent on application.

An assessment that a light signal is a potentially harmful light signal may be provided by the processing device 125 to the alert system 165 and/or the aperture protection system 170. In some cases, the assessment may specifically categorize the potentially harmful light signal by providing a class associated with a light signal (e.g., class 4), providing a qualitative characteristic (e.g., "high" power density, red laser) and/or quantitative characteristic (e.g., numerical power density value, wavelength value) associated with the light signal, and so forth. In various applications, qualitative assessments can be made at the processing device 125 as to whether a detected light signal is dangerous and whether the light signal warrants further review or addressing an attacker, since, while quantitative values are estimated by the light signal detection device 120 and the processing device 125, accurate quantitative values (e.g., accurate estimated power measurements) from, for example, the attacker (e.g., a non-cooperative laser user) in the field are generally not practical. In some cases, data transmitted between the processing device 125, the alert system 165, and the aperture protection system 170 may be encrypted. For example, the processing device 125 may communicate with alert systems, aperture protection systems, and/or other systems authenticated to the light signal assessment device 110, and/or vice versa.

A warning(s) provided by the alert system 165 and/or mitigation action(s) effectuated by the aperture protection system 170 may be based on the data from the imaging device 115 and the light signal detection device 120 and the assessment(s) from the processing device 125 (e.g., generally derived based in part on the data from the imaging device 115 and the light signal detection device 120).

The alert system 165 may include one or more alert devices (e.g., also referred to as alert units or indicator devices/units) for providing an alert associated with a light signal. An alert device may provide a tactile alert (e.g., vibration), an audio alert, and/or a visual alert. As an example, with reference to the ANSI Z136.1 MPE thresholds, a comparison of an MPE with a determined power density may be used by the processing device 125 to trigger alerts by the alert system 165. In some cases, the user may be able to customize alert thresholds and associated alerts (e.g., alert type such as tactile, audio, and/or visual, and/or alert intensity) alternatively or in addition to standard-defined (e.g., ANSI-defined) thresholds. In some cases, an alert device may be worn by the user and/or held by the user. In some cases, an alert device may be remote from the user and operated by one or more other operators (e.g., to support the user if the user is attacked by a light signal). As one example, an alert device may be implemented on a device (e.g., smartphone) with a display accessible to the user. The display may present a graphical user interface (GUI) that displays combined images (e.g., scene video with overlays providing information about the light signals) generated by the processing device 125. The GUI may be associated with a software application installed on the device. The software application may be associated with the light signal assessment device 110 and may facilitate operation of the light signal assessment device 110 with the device.

The aperture protection system 170 may include one or more devices to protect an aperture(s) (e.g., human eye(s), sensor aperture(s)) from a light signal determined by the processing device 125 to be a potentially harmful light signal. In this regard, the aperture protection system 170 may be positioned in front of the aperture(s) and selectively pass light to or block light from the aperture(s). For a given light signal, the aperture protection system 170 may selectively pass the light signal to or block the light signal from the aperture(s) based on the characteristic(s) (e.g., power, wavelength) of the light signal determined by the light signal detection device 120 and/or the assessment value(s) associated with the light signal determined by the processing device 125. As an example, the aperture protection system 170 may be based on switchable liquid crystal filters. In some aspects, the aperture protection system 170 may turn opaque across wavelengths spanning the bandwidth of the light signal assessment device 110. In other aspects, the aperture protection system 170 may turn opaque only in portions determined to have an incident potentially harmful light signal whereas other portions remain transparent, and/or the aperture protection system 170 may turn opaque only for those wavelengths associated with an incident potentially harmful light signal whereas light associated with other frequencies can pass through to the aperture(s). A type (e.g., wavelength, power) and precision/granularity of data provided by the light signal detection device 120 and/or the processing device 125 and aperture protection effectuated by the aperture protection system 170 in response to such data are generally dependent on application (e.g., including cost considerations, power considerations, and so forth).

In some embodiments, the light signal assessment device 110 may include a night vision device to facilitate nighttime operation. As an example, the imaging device 115 may be a visible-light camera used to capture the scene 140 during daytime. During nighttime, the night vision device may be used instead of or together with the imaging device 115. As one example, the night vision device may include a visible-light illumination device that illuminates the scene 140 during nighttime to facilitate visibility by the user and the imaging device 115. As another example, the night vision device may include an IR camera (e.g., a microbolometer-based thermal camera) and/or an eye-safe NIR illuminator to facilitate capture of the scene 140 during nighttime.

Figure 2A:
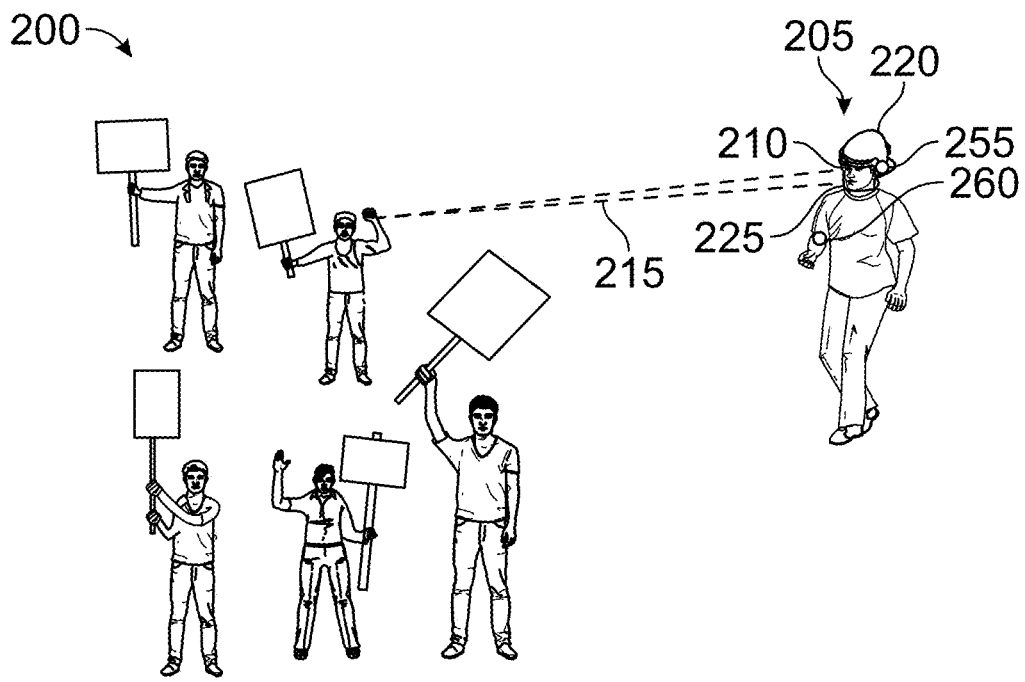
FIG. 2A illustrates an example of an environment in which light signal assessment and associated alert and aperture protection may be implemented in accordance with one or more embodiments of the present disclosure.
Figure 2B:
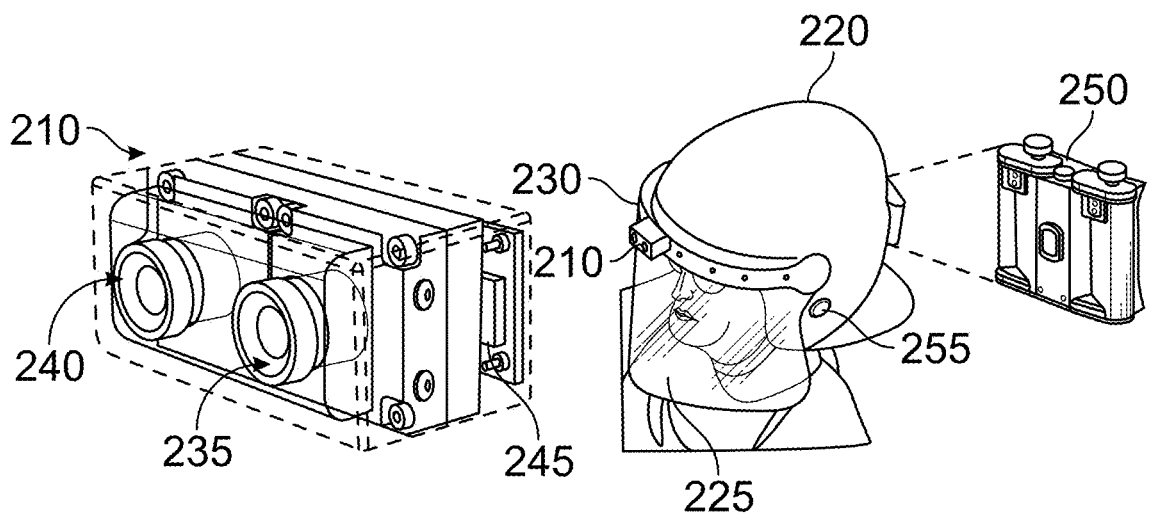
FIG. 2B illustrates a zoomed-in view of the head of a user of a light signal assessment device in the environment of FIG. 2A.

FIG. 2A illustrates an example of an environment 200 in which light signal assessment (e.g., laser threat assessment) and associated alert and aperture protection may be implemented in accordance with one or more embodiments of the present disclosure. FIG. 2B illustrates a zoomed-in view of the head of a user 205 of a light signal assessment device 210 in the environment 200 of FIG. 2A. Not all of the depicted components may be required, however, and one or more embodiments may include additional components not shown in FIGS. 2A and 2B. Variations in the arrangement and type of the components may be made without departing from the spirit or scope of the claims as set forth herein. Additional, fewer, and/or different components may be provided.

In the environment 200, a laser beam 215 from a laser light source is directed at the user 205. The user 205 wears a helmet 220 having a visor 225. A strap 230 may be coupled to the helmet 220 and/or the visor 225 via one or more engagement elements. The light signal assessment device 210 may be coupled to the strap 230 via one or more engagement elements. By way of non-limiting examples, engagement elements to couple the strap 230 to the helmet 220 and/or the visor 225 and/or to couple the light signal assessment device 210 to the strap 230 may include adhesives, nails, magnetics, suction cups, bumps and ridges, and/or generally any structure(s) to allow the light signal assessment device 210 to be supported and maintained in place by the helmet 220, the visor 225, and/or the strap 230.

The light signal assessment device 210 includes a light signal detection device 235, a scene-capture imaging device 240, and electronics 245. The light signal detection device 235 may be utilized for measuring characteristics associated with the laser beam 215. By way of non-limiting examples, the laser characteristics include a wavelength(s), a direction (e.g., direction of arrival), and a strength associated with the laser beam 215. The scene-capture imaging device 240 may be utilized for capturing images (e.g., snapshots) of a scene that encompasses the laser beam 215. The scene-capture imaging device 240 may capture images of a scene continuously (e.g., to provide real-time status of the scene) or upon (e.g., in response to) threat detection. The threat detection may be by the light signal detection device 235, by the user 205, and/or by other device(s) and/or other operator(s). In some cases, when operated in a trigger mode, the scene-capture imaging device 240 may start capturing images in response to a control signal from the light signal detection device 235, the electronics 245, and/or a user instruction (e.g., the user 205 presses a button for the scene-capture imaging device 240 to capture images). The electronics 245 may include a processor to process data from the light signal detection device 235 and/or the scene-capture imaging device 240, assess light signals based on the data, and communicate with external systems (e.g., aperture protection systems, alert systems). The electronics 245 may also include other circuitry, such as a power management device, a GPS, and/or a memory device.

In some aspects, a battery pack 250 is coupled to the helmet 220 (e.g., a back side of the helmet 220) via one or more engagement elements. The battery pack 250 may provide power to the light signal assessment device 210. Alternatively or in addition, in some aspects, one or more batteries may be within a housing of the light signal assessment device 210. In some aspects, an alert device 255 and/or an alert device 260 may be third party devices relative to the light signal assessment device 210. In some cases, the power management device may control power provided by the battery pack 250 and/or other power sources.

In some embodiments, the light signal assessment device 210 may be, may include, or may be a part of the light signal assessment device 110 of FIG. 1. As such, the foregoing description of components of the light signal assessment device 110 of FIG. 1 generally applies to corresponding components of the light signal assessment device 210 of FIG. 2B. An example range of a width W of the light signal assessment device 210 as shown in FIG. 2B may be between 2 inches and 3 inches. Sizes and positioning of light signal assessment devices used in any given environment is generally application dependent. For example, in applications involving wider FOVs, multiple light signal assessment devices may be mounted (e.g., on a human, on a vehicle, etc.) and/or a larger light signal assessment device may be mounted to provide wider FOVs, processing power, and/or other functionality accommodated by additional light signal assessment devices and/or larger sized light signal assessment devices.

In some aspects, the light signal assessment device 210 may be implemented according to a modular design that supports scaling up with additional light signal assessment devices, which may extend an FOV (e.g., up to 360°), increase a detection area, and increase probability of detecting threat beams. With respect to the environment 200, one or more additional light signal assessment devices may be positioned along a circumference of the helmet 220 and the visor 225 to provide up to 360° FOV. Alternatively or in addition to adding light signal assessment devices, higher resolution focal plane and/or interpolated resolution (e.g., accommodated with higher processing power) may also be used.

The light signal assessment device 210 may transmit data (e.g., via wired and/or wireless link(s)) associated with potentially harmful light signals to the alert devices 255 and 260. Such data may include threat assessments generated by the electronics 245, data captured by the light signal detection device 235, data captured by the imaging device 240, and/or other data associated with the potentially harmful light signals. In some cases, the battery pack 250 may provide power (e.g., selectively provide power) to the alert device 255 and/or the alert device 260.

The alert device 255 is coupled to the helmet 220. The alert device 255 may be proximate to one or both ears of the user 205. In some aspects, the alert device 255 may include one or more audio devices for providing a sound alarm to the user 205 in response to data indicative of a potentially harmful light signal received from the electronics 245. A type(s) and an amount of data provided by the sound alarm is generally application dependent and may be configurable/set by the user 205. As one example, the sound alarm may be a beeping sound to indicate presence of a light signal (e.g., categorized as potentially harmful by the electronics 245) and emit no sound when no light signals are detected by the light signal assessment device 210. As another example, the sound signal may be a voice signal providing data associated with a detected light signal. In such an example, the voice signal may recite "Warning! Red laser, right 34 degrees, up 6 degrees" to indicate the color (i.e., wavelength) and the direction of arrival of the laser beam 215.

In some aspects, alternatively or in addition to including an audio device, the alert device 255 may include one or more vibration devices. In some cases, multiple vibration devices may be mounted in proximity to the user 205. Each of the vibration devices may be associated with a range of values for directions of arrival for light signals and may vibrate when a light signal has a direction of arrival within its range. As one example, a vibration device may vibrate at a predetermined vibration intensity to indicate presence of a light signal and not vibrate when no light signals are detected by the light signal assessment device 210. As another example, a vibration intensity of the vibration device may be based on characteristics associated with the laser beam 215. For example, a vibration device may vibrate at a vibration intensity that is proportional to a laser strength associated with the laser beam 215.

The alert device 260 may be worn by the user 205 and/or held by the user 205. In one aspect, the alert device 260 may include a watch (e.g., smartwatch) worn by the user 205 and/or a phone (e.g., smartphone) held by the user 205. As an example, the watch and/or the phone may implement a vibration device. The vibration device may vibrate at a predetermined vibration intensity to indicate presence of a light signal and not vibrate when no light signals are detected by the light signal assessment device 210. Alternatively, a vibration intensity of the vibration device may be based on characteristics associated with the laser beam 215.

As another example, the watch and/or phone may have a display that presents a GUI. The GUI may be associated with a software application installed on the watch and/or phone. The software application may be associated with the light signal assessment device 210 and may facilitate operation of the light signal assessment device 210 with the alert device 255, the alert device 260, and/or other devices (e.g., third party devices relative to the light signal assessment device 210). The GUI may display (e.g., in real time) output images from the light signal assessment device 210 containing data from the light signal detection device 235 and/or assessments derived therefrom overlaid on light signal detection images and/or scene video/images captured by the imaging device 240. For example, output images may be displayed as individual static images and/or as a series of images in a video sequence. In some cases, the user 205 may toggle/turn on and off display of the overlays (or subset thereof), display of the light signal detection images, and/or display of the scene video/images. As such, the GUI may provide the user 205 with ready access to detailed characteristics associated with each light signal-related threat detected and assessed by the light signal assessment device 210. In some cases, alternatively or in addition, the GUI may present text that recites "Warning! Red laser, right 34 degrees, up 6 degrees" to indicate the color (i.e., wavelength) and the direction of arrival of the laser beam 215.

Although the alert devices 255 and 260 are readily accessible to the user 205, in some cases the light signal assessment device 210 may alternatively or in addition communicate with one or more alert devices remote from the user 205. As an example, such remote alert devices may be used by other first responders that support the user 205 to identify and apprehend an attacker that is directing the laser beam 215 at the user 205.

Figure 3:
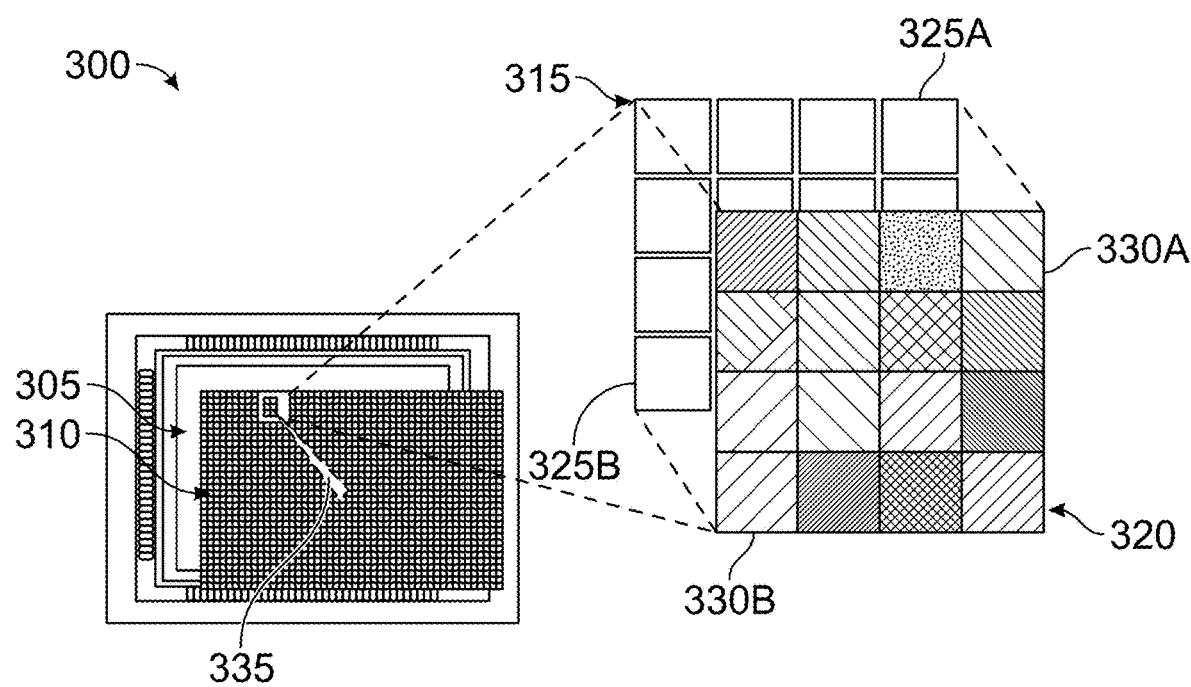
FIG. 3 illustrates an example multi-spectral imaging device in accordance with one or more embodiments of the present disclosure.

FIG. 3 illustrates an example multi-spectral imaging device 300 (e.g., also referred to as a multi-spectral camera) in accordance with one or more embodiments of the present disclosure. In some embodiments, the multi-spectral imaging device 300 may be, may include, may be a part of, and/or may be used to implement the light signal detection device 120 and/or 235 of FIGS. 1 and 2B, respectively.

The multi-spectral imaging device 300 includes a focal plane array (FPA) 305 and a patterned (e.g., micro-patterned) spectral bandpass filter 310. The patterned spectral bandpass filter 310 may be utilized to filter incident light and provide the filtered light to the FPA 305. Each pixel of the FPA 305 may include sub-pixels, with each sub-pixel positioned to receive light within a certain waveband as filtered by a respective filter of the spectral bandpass filter 310 corresponding to the sub-pixel. A geometric pattern of element filters of the spectral bandpass filter 310 corresponds to a geometric pattern of sub-pixels of the FPA 305, such that each filter-subpixel pair forms a spectral discriminator and responds (e.g., responds primarily/nominally only) to light whose wavelength falls within a wave band (e.g., also referred to as a spectral band) associated with the element filter. In this regard, the FPA 305 includes a detector array and the spectral bandpass filter 310 includes a filter array that corresponds to the detector array. Each pixel may be referred to as a super pixel. Based on context, a super pixel or simply pixel may refer to detectors of the FPA 305 (e.g., alone or together with their corresponding filter elements) that generate associated pixel values or a super pixel or pixel (e.g., pixel location, pixel coordinate) of an image formed from the generated pixel values.

Neighboring filter-subpixel pairs may be arranged to cover different spectral bands of a continuum. As an example, in FIG. 3, a super pixel 315 of the FPA 305 and an array 320 of element filters of the spectral bandpass filter 310 that corresponds to the super pixel 315 are labeled. A light signal 335 is incident on at least the super pixel 315. The super pixel 315 is formed of sixteen sub-pixels and the array 320 is formed of sixteen element filters. In this regard, each super pixel is formed of a contiguous set of detectors and a corresponding contiguous set of filters. Each element filter may filter light incident on the element filter to extract a wavelength component(s) of the incident light corresponding to a pass band of the element filter and attenuate any wavelength component outside the pass band. Sub-pixels 325A and 325B of the super pixel 315 and their corresponding element filters 330A and 330B, respectively, are labeled. As examples, the element filter 330A may filter light incident on the element filter 330A to extract an indigo component of the incident light (if any) and provide the filtered light to the sub-pixel 325A, and the element filter 330B may filter light incident on the element filter 330B to extract an orange component of the incident light (if any) and provide the filtered light to the sub-pixel 325B. Each of remaining fourteen sub-pixels also has its corresponding element filter with its respective pass band.

Figure 4:
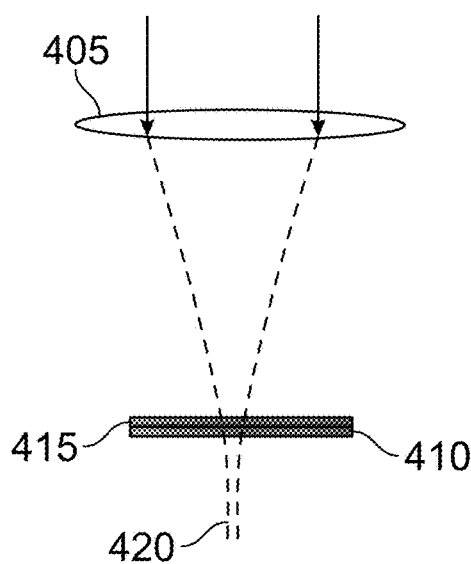
FIG. 4 illustrates an imaging lens that directs light to an array of filter elements in accordance with one or more embodiments of the present disclosure.

As a non-limiting example, a notional spectral bandwidth of each element filter (e.g., the element filter 330A, the element filter 330B) may be around 50 nm. In various applications, a spectral bandwidth of 50 nm may be sufficient for threat assessment, documentation, and/or triggering protective measures. In some cases, spectral bands associated with different element filters in each super pixel may partially overlap. As shown in FIG. 4, each super pixel group pattern may include a 4×4 array of sub-pixels and their corresponding element filters. Each super pixel group pattern may cover a spectral range from around 400 nm to around 1,100 nm. In some aspects, a resolution may be readily increased (e.g., by using a 5×5 or larger super pixel group pattern) or decreased (e.g., by using a 3×3 or smaller super pixel group pattern) dependent on application. The multi-spectral imaging device 300 may nominally provide a 120° horizontal FOV×60° vertical FOV. Using a two-million subpixel focal plane formed of 2,000 subpixels×1,000 sub-pixels and 4×4 grouping, an effective format of a multi-spectral super pixel array of the multi-spectral imaging device 300 is 500 super pixels×250 super pixels to provide a spatial resolution (e.g., indicative of an accuracy of a location of a light source) of around 0.3°. In some aspects, a design (e.g., modular design) of the multi-special imaging device 300 may allow for extending of an FOV of a light signal assessment device (e.g., to 360°) by adding more light signal receivers. Higher resolution focal plane and/or interpolated resolution (e.g., accommodated with higher processing power) may also be used.

An image captured by the multi-spectral imaging device 300 is composed of super pixels (e.g., each formed of sub-pixels) and contains data indicative of a location, an intensity, and a wavelength of an incident light signal. In an aspect, such an image may be referred to as a multi-spectral image. In a case with multiple incident light signals (e.g., multiple beams), the multiple incident light signals may activate different super pixels and can be simultaneously measured for assessment. In an aspect, pixel values generated by each sub-pixel of the FPA 305 are based on (e.g., proportional to) a registered light signal energy accumulated over an exposure time of the sub-pixel. A power (e.g., energy divided by exposure time) of an incident light signal may be determined based on the pixel values and the exposure time.

If the power of an incident light signal is too high and/or an exposure time is too long, pixel values generated by one or more of the sub-pixels may saturate (e.g., be at a maximum count value that can be generated/output by the detectors). Saturated pixel values indicate a low boundary of the power of the incident light signal. In some cases, to reduce a likelihood of pixel saturation, the multi-spectral imaging device 300 may be operated at a high frame rate (e.g., greater than 60 frames per second) and/or perform imaging at multiple (e.g., two or three) different integration times during each hit by a light signal to achieve a substantially increased dynamic range. Light signal assessment and/or other analysis (e.g., by the multi-spectral imaging device 300 and/or downstream of the multi-spectral imaging device 300) may be based on an image set associated with an optimal integration time (e.g., associated with least pixel saturation).

A spectral coverage (e.g., indicative of a bandwidth) of the multi-spectral imaging device 300 is generally limited by a responsivity of the FPA 305. In some embodiments, the FPA 305 may be implemented with high-sensitivity/enhanced NIR response together with visible-light response to facilitate assessment of light signal-related threats to human eyes. As an example, the FPA 305 may be implemented with low-cost silicon sensors that provide a spectral coverage (e.g., allow detection of (filtered) light signals having wavelengths within the spectral coverage) that spans between around 400 nm to 1,100 nm, which encompasses a majority of a spectral band of interest in various applications, such as safety enforcement, based on availability of light sources (e.g., pointers) and use of image intensified night vision devices.

In some embodiments, the multi-spectral imaging device 300 may be, may include, or may be a part of, a thermal camera with a spectral coverage that includes thermal wavelengths (e.g., MWIR and/or LWIR) dependent on application. Thermal wavelengths are considered eye-safe and light signal-related threats (e.g., laser threats) from thermal wavelength bands are generally rare and expensive to procure in typical scenarios (e.g., civilian scenarios). As one example application, the multi-spectral imaging device 300 may be designed to cover thermal wavelengths (e.g., alternatively to or in addition to NIR and/or visible-light wavelengths) when facilitating assessment of light signal-related threats to thermal wavelength sensor apertures.

In some embodiments, the multi-spectral imaging device 300 may include components to cause incident light signals (e.g., laser beam spots) to be large enough to fill at least one super pixel. Such components may facilitate detection by the multi-spectral imaging device 300 of highly collimated beams, which can have a size (e.g., spot size) smaller than a super pixel and thus avoid detection when not enlarged. In some cases, spot tracking and centroiding algorithms may be implemented to preserve an effective spatial resolution of the multi-spectral imaging device 300, which may otherwise be reduced if a light signal (e.g., a beam spot of the light signal) covers multiple super pixels. Such spot tracking and centroiding algorithms may be performed by a light signal detection device (e.g., the light signal detection device 120) and may include determining a centroid for each cluster and tracking a location of the centroid over time (e.g., over images captured at different times). Centralization may be used to resolve a spot center when a light signal covers multiple super pixels.

As one example, FIG. 4 illustrates an imaging lens 405 that directs light to an array 415 of filter elements in accordance with one or more embodiments of the present disclosure. Each filter element of the array 415 may filter light incident on the filter element and direct the filtered light to a corresponding detector (e.g., sub-pixel) of an FPA 410. The imaging lens 405 may be defocused (e.g., slightly defocused) so that a size of a light signal (e.g., spot size of a beam) on the FPA 410 fills at least one super pixel. This ensures that, for example, a spot size from even a highly collimated beam, which may be smaller than a super pixel, does not avoid detection. As shown in FIG. 4, a lens focus 420 is positioned downstream of the FPA 410. In an embodiment, the array 415 may be, may include, or may be a part of the spectral bandpass filter 310, and/or the FPA 410 may be, may include, or may be a part of, the FPA 305.

Although not shown in FIG. 4, additional optics (e.g., optical components such as beam splitters, lenses, mirrors, etc.) may be positioned upstream of the imaging lens 405 to direct light to the imaging lens 405 and/or between the imaging lens 405 and the array 415 to direct light from the imaging lens 405 to the array 415. In some cases, the imaging lens 405 and one or more additional optical components may be used together to defocus incident light. In an embodiment, a multi-spectral imaging device (e.g., the multi-spectral imaging device 300) may include the imaging lens 405, the array 415 of filter elements, the FPA 410, and, in some cases, other components (e.g., additional optical components).

Figure 5:
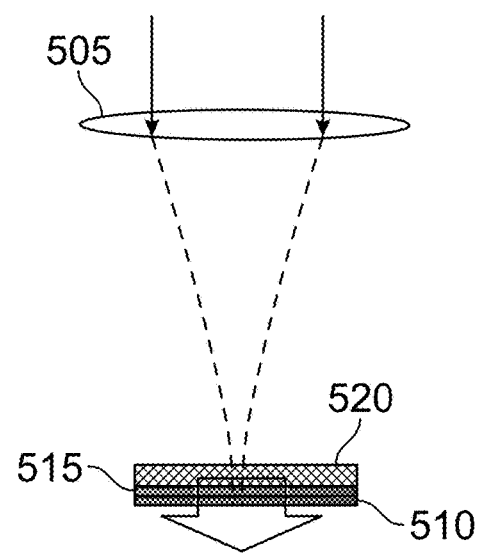
FIG. 5 illustrates an imaging lens that directs light to a film in accordance with one or more embodiments of the present disclosure.

As another example, FIG. 5 illustrates an imaging lens 505 that directs light to a film 520 in accordance with one or more embodiments of the present disclosure. The film 520 may be a diffusive film, a diffractive film, or generally any film appropriate to increase a size of a light signal such that the resized light signal covers at least one super pixel of an FPA 510. The film 520 is placed proximate to and over an array 515 of filter elements. By way of non-limiting examples, the film 520 may be made of polymer (e.g., cellulose triacetate), ground glass, BK7-fused silica, silicon nitride, and/or other material. Each filter element of the array 515 may filter light incident on the filter element and direct the filtered light to a corresponding detector (e.g., sub-pixel) of the FPA 510. In some cases, the imaging lens 505 is not defocused and a light signal may be increased in size (e.g., spot size) by the film 520. In an embodiment, the array 515 may be, may include, or may be a part of the array 310, and/or the FPA 510 may be, may include, or may be a part of, the FPA 305. In an embodiment, a multi-spectral imaging device (e.g., the multi-spectral imaging device 300) may include the imaging lens 505, the array 515 of filter elements, the FPA 510, and, in some cases, other components (e.g., additional optical components).

Figure 6:
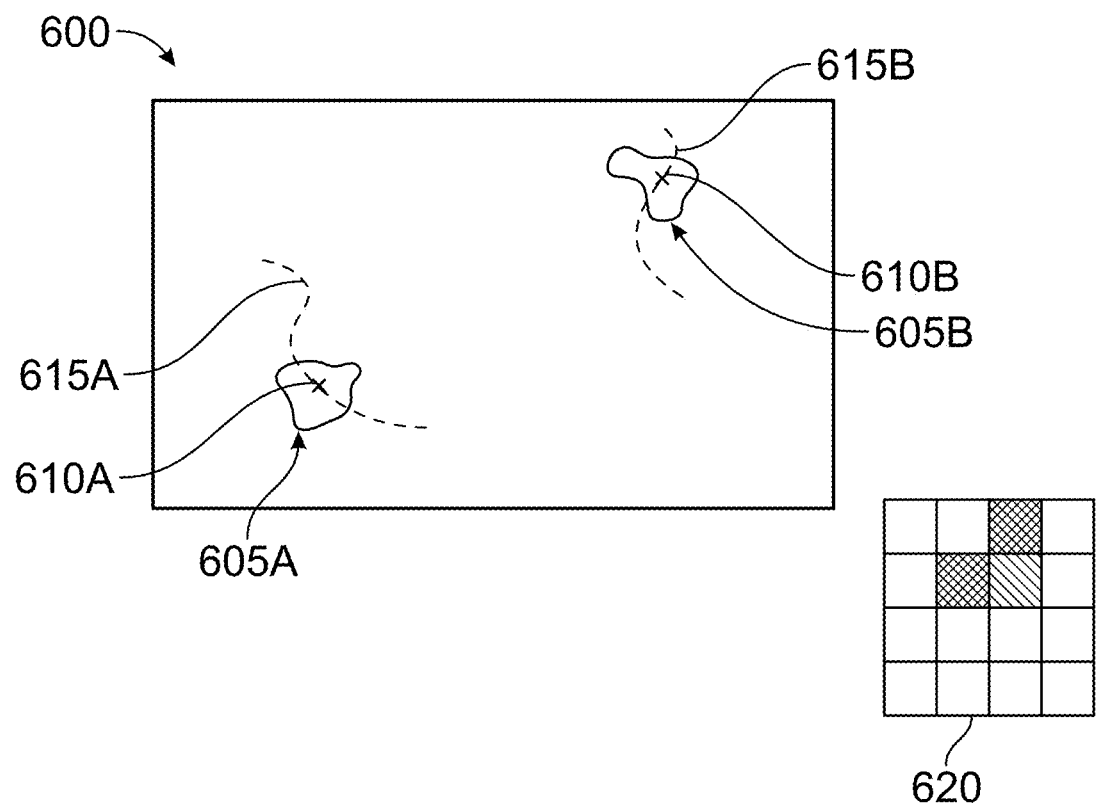
FIG. 6 illustrates centroiding and spot tracking associated with a light signal detection image in accordance with one or more embodiments of the present disclosure.

FIG. 6 illustrates centroiding and spot tracking associated with a light signal detection image 600 in accordance with one or more embodiments of the present disclosure. For explanatory purposes, in an embodiment, the light signal detection image 600 may be an image of the scene 140 captured by the light signal detection device 120. The light signal detection image 600 shows clusters 605A and 605B of pixels. Each of the clusters 605A and 605B is formed of a respective set of contiguous pixels that have pixel values exceeding a detection threshold (e.g., a threshold count value). In this regard, each of the clusters 605A and 605B represents a detection of a light signal by the light signal detection device 120. Although two detections are shown in the light signal detection image 600, a given light signal detection image may include more than two detections, only one detection, or no detections.

The light signal detection device 120 may determine a centroid 610A associated with the cluster 605A and a centroid 610B associated with the cluster 605B. The centroids 610A and 610B may be considered a center point associated with the clusters 605A and 605B, respectively, and may each be indicative of a most likely location of a respective light source whose light signal generated the clusters 605A and 605B. The centroids 610A and 610B may be based on a weighted average of the pixels that form the clusters 605A and 605B, respectively. The light signal detection device 120 may track a frame-to-frame drift/movement of the centroids 610A and 610B. A trajectory 615A is associated with movement of the centroid 610A and a trajectory 615B is associated with movement of the centroid 610B. Such movement may include movement of the light signal detection device 120 (e.g., movement of its pointing direction), movement of the scene 140 or portion thereof, movement of one or more light sources (e.g., people holding the light source(s)), and/or others. The trajectories 615A and 615B indicate a location of the centroids 610A and 610B, respectively, in images captured by the light signal detection device 120 before and after capture of the light signal detection image 600. A wavelength of each of the two light signals may be based on a pixel (e.g., super-pixel) within the cluster 605A and the cluster 605B. As an example, the light signal detection device 120 may determine a wavelength associated with the cluster 605B based on a pattern within a super-pixel 620 (e.g., pixel values for each sub-pixel of the super-pixel 620) of the cluster 605B.

Figure 7A:
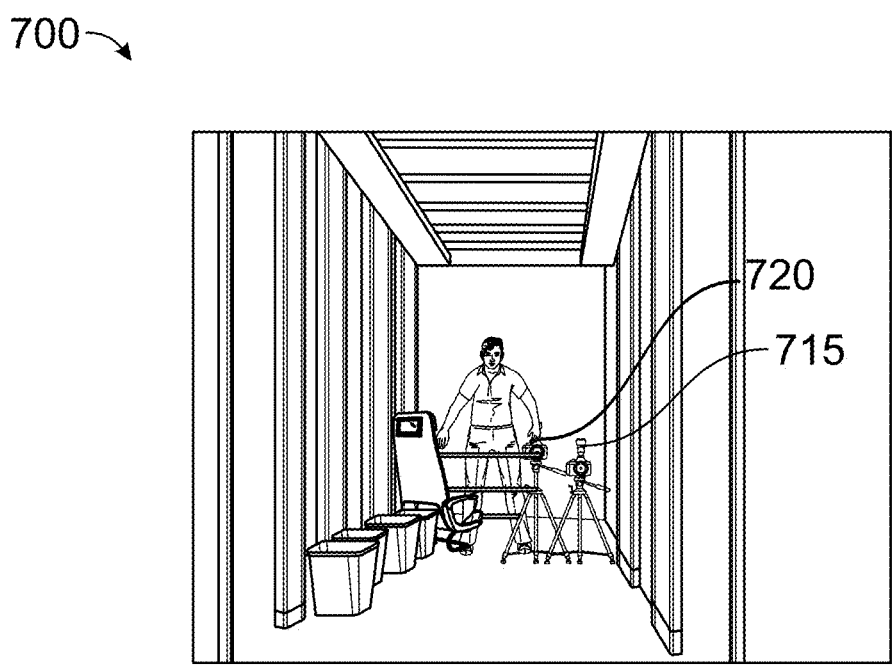
FIG. 7A illustrates an example image generated by an imaging device.
Figure 7B:
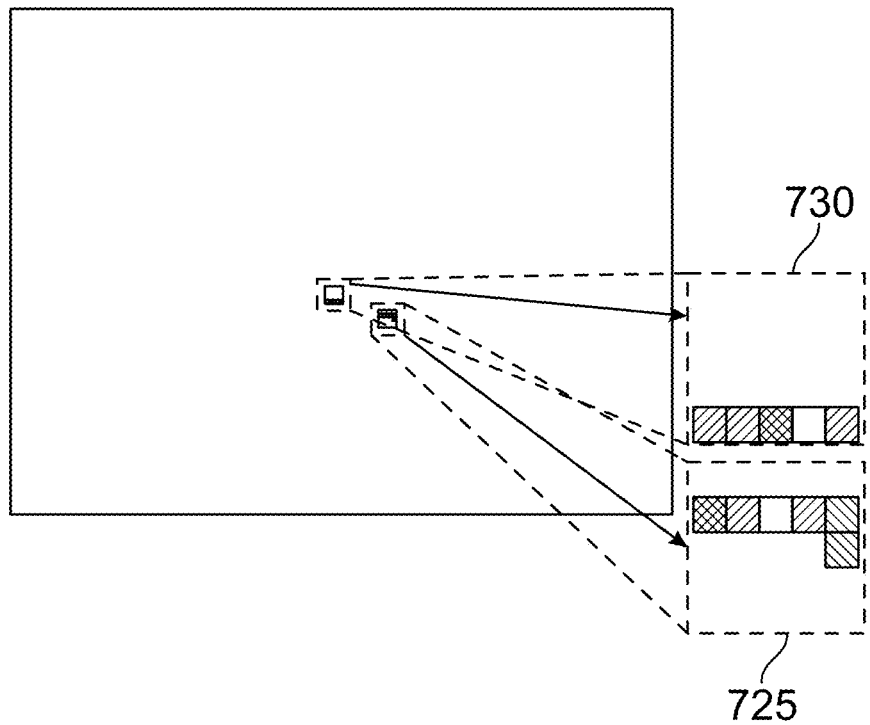
FIG. 7B illustrates an example image generated by a light signal detection device in accordance with one or more embodiments of the present disclosure.
Figure 7C:
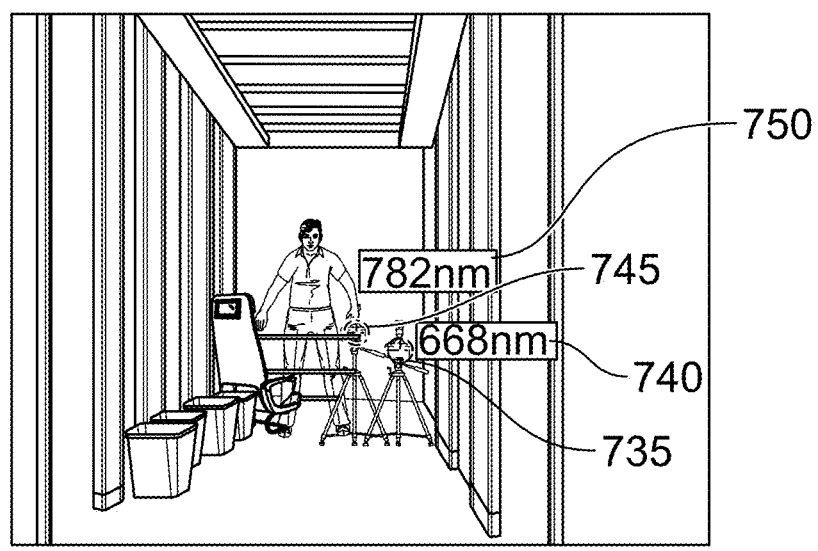
FIG. 7C illustrates an example image formed by overlaying data from the image of FIG. 7B on the image of FIG. 7A in accordance with one or more embodiments of the present disclosure.

FIG. 7A illustrates an example image 700 (e.g., color camera scene image) generated by an imaging device (e.g., the imaging device 115). FIG. 7B illustrates an example image 705 (e.g., light signal detection image) generated by a light signal detection device (e.g., the light signal detection device 120) in accordance with one or more embodiments of the present disclosure. As an example, for explanatory purposes, the image 705 may be captured using the multi-spectral imaging device 300 of FIG. 3. FIG. 7C illustrates an example image 710 (e.g., a combined image) formed by overlaying (e.g., sensor fusing) data from the image 705 of FIG. 7B on the image 700 of FIG. 7A in accordance with one or more embodiments of the present disclosure. The image 700 is an image of a scene that includes light sources 715 and 720. As examples, for explanatory purposes, the light source 715 is a laser source that is emitting a 1 mW, 668 nm (i.e., red) laser signal and the light source 720 is a laser source that is emitting a 1 mW, 782 nm (i.e., NIR) laser signal. The image 700, 705, and/or 710 may be displayed using a display device (e.g., of the alert device 260), such as to a user (e.g., the user 205). In some cases, the user may indicate which of the images 700, 705, and/or 710 (if any) to display.

With reference to FIG. 7B, the image 705 has non-zero pixel values within portions 725 and 730 of the image 705 and zero pixel values elsewhere (e.g., indicative of no light signals at these locations). The portion 725 and the portion 730 of the image 705 are each associated a respective super pixel that captures the light signal from the light source 715 and the light source 720, respectively. In this example, each super pixel has 4×4 sub-pixels, with each sub-pixel being associated with a wavelength bin. In some cases, a spectral bandwidth of each element filter associated with a sub-pixel is around 50 nm. The portion 725 shows pixel values generated by the sub-pixels in response to the 668 nm laser signal from the light source 715. The portion 730 shows pixel values generated by the sub-pixels in response to the 782 nm laser signal from the light source 720. In this regard, the pixel values in the portions 725 and 730 and their associated wavelengths may represent a fingerprint left on the light signal detection device by the laser signals from the light sources 715 and 720, respectively.

The light signal detection device may identify a wavelength bin(s) within which a wavelength(s) of the light signals from the light sources 715 and 720 falls and an intensity associated with the light signals based on the fingerprints. The light signal detection device and/or processing circuitry downstream of the light signal detection device may determine (e.g., estimate) a power associated with the light signals based on the fingerprints (e.g., wavelength bins, intensities) and calibration data. In some cases, such calibration data may be determined during calibration of the light signal detection device and provide relationships (e.g., via equations, lookup tables, correlation, and/or others) between wavelength bins, intensities, pixel values, and light source power received at an aperture of the light signal detection device. The calibration data may be based on application-specific data.

As one example, threat assessment algorithms may use an estimated beam size based on the detected wavelength (e.g., which typically represents a prevalent technology at that wavelength), persistence/flicker of a beam, and camera/sensor calibration data to estimate light signal power. Alert levels may be created based on comparison of power with MPE per the ANSI Z136.1 standard. A user may be able to customize alerts and alert thresholds during testing and evaluation.

With reference to FIG. 7C, a position of the light source 715 is highlighted using a graphical overlay 735 (e.g., crosshair) and a wavelength (e.g., 668 nm) associated with the light signal emitted by the light source 715 is reported using a textual overlay 740 (e.g., with a white box around the text to enhance visibility of the text). Similarly, a position of the light source 720 is highlighted using a graphical overlay 745 and a wavelength (e.g., 782 nm) associated with the light signal emitted by the light source 720 is reported using a textual overlay 750 (e.g., with a white box around the text to enhance visibility of the text). In some cases, one or more overlays may have a color, size, and/or shape that maximize their respective contrast with respect to the scene. Alternatively or in addition, in some cases, characteristics (e.g., color, size, and/or shape) of an overlay may itself provide information associated with light signals. For example, a textual overlay associated with a visible-light signal may provide a numeral value indicating the visible-light signal's wavelength, where the color of the numerical value corresponds to the wavelength (e.g., the textual overlay 740 may present the text "668 nm" in red colored font). For infrared light signals, a color scheme may be defined to map color to infrared wavelengths. In some aspects, types of overlays and data provided by these overlays may be user-defined. For example, with the image 710 presented to the user, the user may indicate to the light signal assessment device to remove the textual overlay 740 and/or 750 and add a textual overlay that indicates the power associated with the light source 715.

Figure 8A:
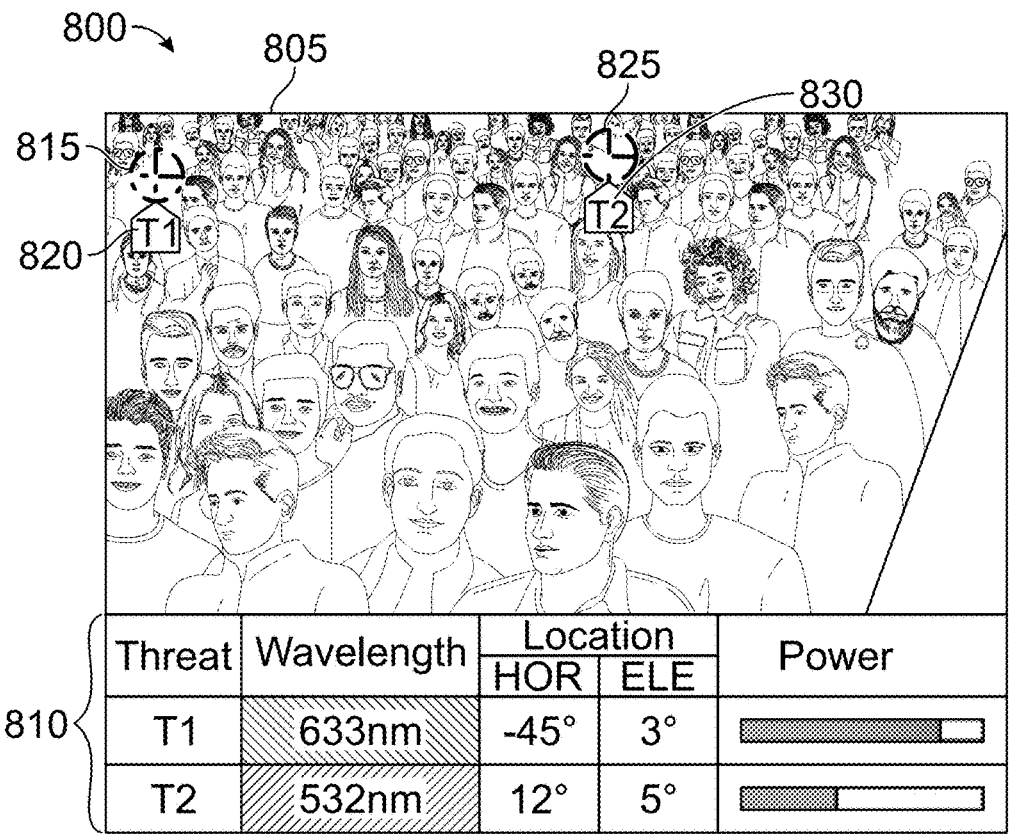
FIGS. 8A and 8B illustrate example graphical user interfaces that include an image and a table with information associated with light signals in the image in accordance with one or more embodiments of the present disclosure.

FIG. 8A illustrates an example GUI 800 that includes an image 805 (e.g., a combined image) and a table 810 with information associated with light signals in the image 805 in accordance with one or more embodiments of the present disclosure. The image 805 may be formed by overlaying (e.g., sensor fusing) data from a light signal detection device (e.g., the light signal detection device 120) and a scene image from a context camera (e.g., the imaging device 115). A position of a first light source is highlighted using a graphical overlay 815 (e.g., crosshair) and a graphical overlay 820 (e.g., tag symbol with identifier therein). A position of a second light source is highlighted using a graphical overlay 825 and a graphical overlay 830. In some cases, as shown by the graphical overlays 820 and 830, the first light source and the second light source may be labeled T1 (e.g., representing threat #1) and T2, respectively, by default by a processing device (e.g., the processing device 125) of the light signal assessment device. In some cases, the user may set names for each detected light source/signal and/or adjust default names set for each detected light source/signal. The table 810 provides data determined (e.g., measured or estimated by the light signal detection device 120 and/or the processing device 125) from the light signals emitted by the first light source and the second light source. Such data may include a wavelength associated with the light signal emitted by each light source, a location of each light source (e.g., horizontal and elevation coordinates relative to a reference location having a horizontal coordinate of 0° and an elevation coordinate of 0°) in the scene, and a power associated with the light signal emitted by each light source. In some cases, the GUI 800 and/or data contained in the table 810 may be customized by the user. In some cases, the image 805 and/or the table 810 may be resized in the GUI 800. In some cases, the user may toggle/turn on and off display of one or more overlays (or subset thereof), the image 805, and/or the table 810.

Figure 8B:
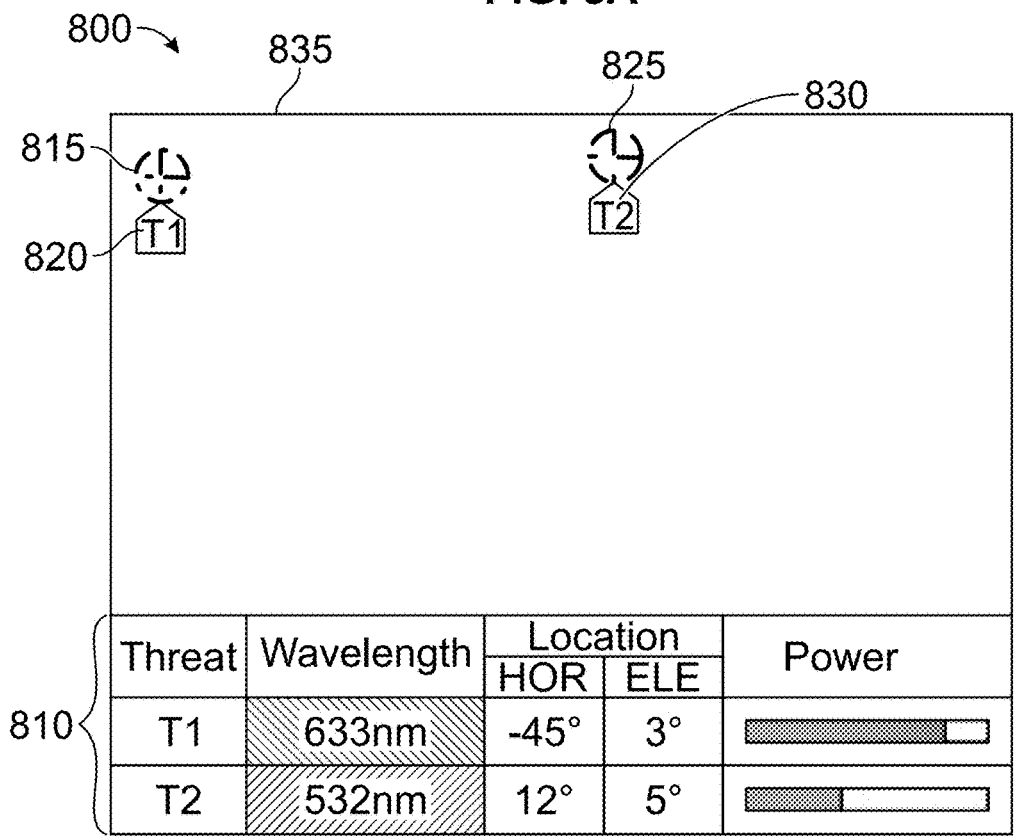

In some embodiments, an annotated light signal detection image may be output by a light signal assessment device. In some cases, a light signal assessment device does not include a scene camera. In other cases, the light signal assessment device includes a scene camera and a user may manually set whether to capture and/or display image data captured by the scene camera. FIG. 8B illustrates the GUI 800 with an annotated light signal detection image 835 in accordance with one or more embodiments of the present disclosure. The annotated light signal detection image 835 includes the graphical overlays 815, 820, 825, and 830 overlaid on a light signal detection image captured by a light signal detection device and the table 810 with information associated with light signals in the image 835. In some cases, the annotated light signal detection image 835 may correspond to the image 805 without scene/context data.

Figure 9:
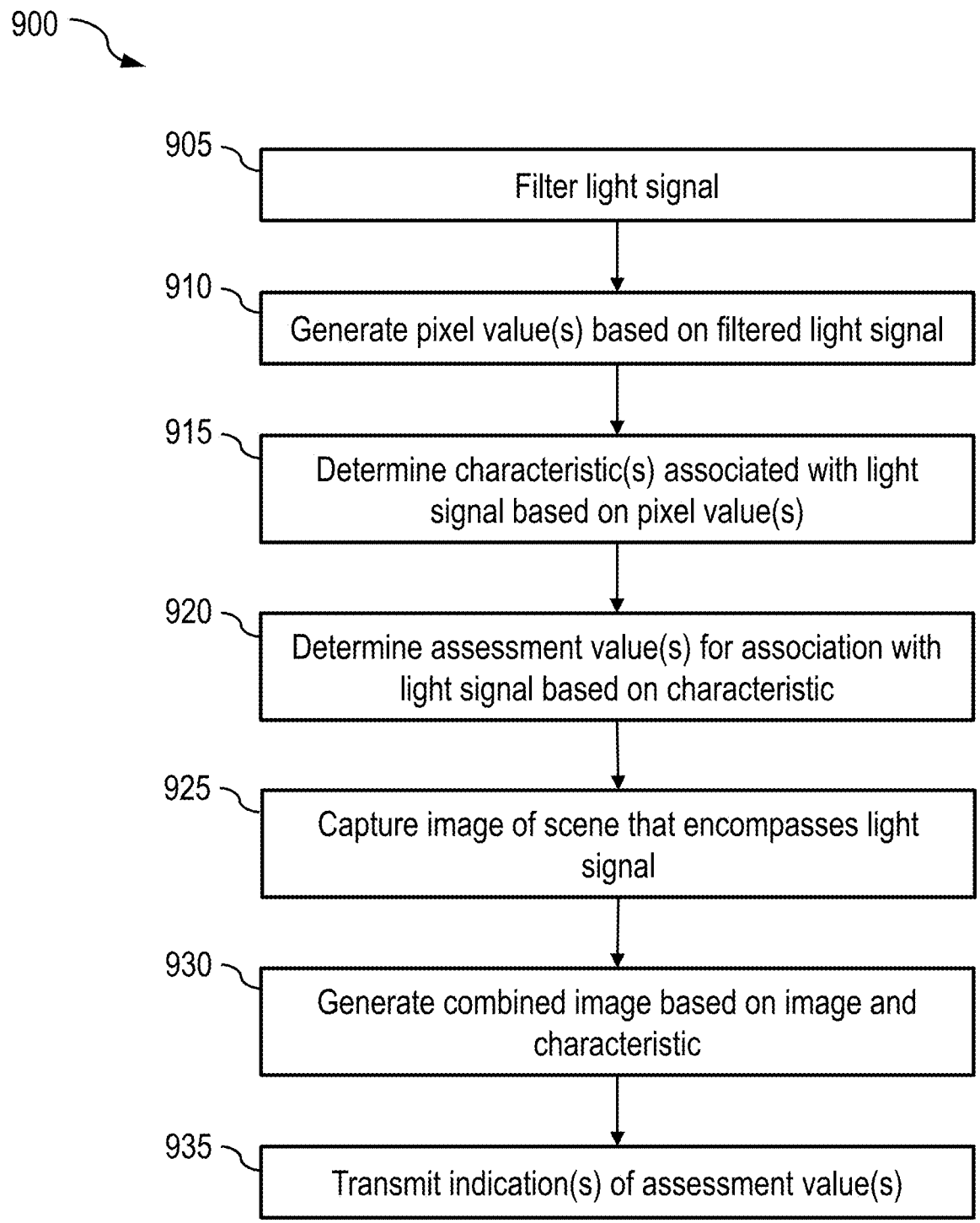
FIG. 9 illustrates a flow diagram of an example of a process for facilitating light signal assessment in accordance with one or more embodiments of the present disclosure.

FIG. 9 illustrates a flow diagram of an example of a process 900 for facilitating light signal assessment in accordance with one or more embodiments of the present disclosure. For explanatory purposes, the process 900 is primarily described herein with reference to the system 100 of FIG. 1. However, the process 900 can be performed in relation to other systems. Note that one or more operations in FIG. 9 may be combined, omitted, and/or performed in a different order as desired.

At block 905, the light signal detection device 120 filters a light signal incident on the filter array to obtain a filtered light signal. In some aspects, filtering is performed by a filter array of the light signal detection device 120. The filter array may include filters, where each filter is associated with a respective passband. A given light signal is incident on at least a subset of the filters. Each filter among the subset receives and filters a respective portion of the light signal to provide a respective portion of the filtered light signal.

At block 910, the light signal detection device 120 generates one or more pixel values based on the filtered light signal. The pixel values may form a light signal detection image. In some aspects, the light signal detection device 120 includes a detector array. Each detector of the detector array may be associated with (e.g., correspond to) one of the filters of the light signal detection device 120. A given light signal is incident on at least a subset of the filters, where these filters provide filtered outputs to a correspond subset of the detectors. Each detector among the subset receives a respective portion of the filtered light signal from its corresponding filter and generates a pixel value based on the respective portion of the filtered light signal. In some aspects, the light signal detection device 120 may be implemented using the multi-spectral imaging device 300 of FIG. 3, in which the array 310 of filters may perform block 905 and the FPA 305 may perform block 910.

At block 915, the processing device 125 determines one or more characteristics associated with the light signal based on the pixel value(s) from the light signal detection device 120. Example characteristics associated with the light signal may include a wavelength, a direction (e.g., direction of arrival), and a strength/intensity associated with the light signal. As an example, the processing device 125 may determine a wavelength associated with the light signal based on which detectors generated the pixel values, since each detector is associated with a filter and its filter's passband. As an example, the processing device 125 may determine a strength associated with the light signal based on the pixel values and a relationship (e.g., lookup table, equation, correlation) between pixel values and strength (e.g., determined during calibration).

At block 920, the processing device 125 determines one or more assessment values (e.g., threat level, threat categorization) based on the characteristic(s). In some cases, the processing device 125 may determine an assessment value (s) based on a comparison of a characteristic with one or more thresholds. For example, the characteristic may be an estimated power of the light signal and the thresholds may be MPE thresholds. Different assessment values (e.g., different threat levels) may be associated with different light signals. The user may utilize the assessment values associated with each light signal to prioritize addressing the light sources (e.g., addressing the attackers aiming the light sources).

At block 925, the imaging device 115 captures an image of the scene 140 that encompasses the light signal. In some cases, the imaging device 115 may operate in triggered mode and capture the image in response to a trigger/control signal from the processing device 125. The processing device 125 may generate and transmit the control signal to the imaging device 115 in response to determining an assessment value that indicates the light signal is potentially harmful. In other cases, the imaging device 115 may operate in continuous mode and capture images continuously and independent of assessments of light signals by the processing device 125. In some aspects, the user of the light signal assessment device 110 may set the imaging device 115 to the trigger mode or the continuous mode, such as based on power usage considerations.

At block 930, the processing device 125 generates a combined image based on the image captured by the imaging device 115 and the characteristic(s) determined by the light signal detection device 120. The combined image may include the image from the imaging device 115 with one or more overlays on the image. Each overlay may include data indicative of and/or derived from the characteristic(s). As an example, a textual overlay may present text indicating a wavelength of the light signal. As another example, a graphical overlay may include a crosshair to enhance visibility of a location of the light signal in the scene 140. In some aspects, block 925 and/or 930 may be optional, such as when scene images are unnecessary for an application (e.g., light signal detection/characterization and assessment are sufficient) and/or when a light signal assessment device does not have a scene camera. In such aspects, at block 930, the processing device 125 may generate an output based on the characteristic(s) and/or assessment value(s). As an example, the output may include an annotated light signal detection image and/or data (e.g., graphical and/or textual) indicative of the characteristic(s) and/or assessment value(s).

At block 935, the processing device 125 transmits an indication(s) of the assessment value(s) to one or more systems. In an embodiment, the processing device 125 may transmit the indication(s) to the alert system 165 and/or the aperture protection system 170. As an example, the alert system 165 may include a smartphone that can provide a visual alert (e.g., displaying the combined image to the user), an audio alert (e.g., voice describing a location and color of a laser beam), and/or a tactile alert (e.g., vibration). In some cases, data transmitted between the processing device 125, the alert system 165, and the aperture protection system 170 may be encrypted. In this regard, the processing device 125 may communicate with alert systems, aperture protection systems, and/or other systems authenticated to the light signal assessment device, and/or vice versa. Different assessment values (e.g., different threat levels) trigger different alerts by the alert system 165 and/or different light signal mitigation by the aperture protection system 170. In some aspects, block 935 is not performed when the processing device 125 determines that the light signal is not potentially harmful.

Figure 10:
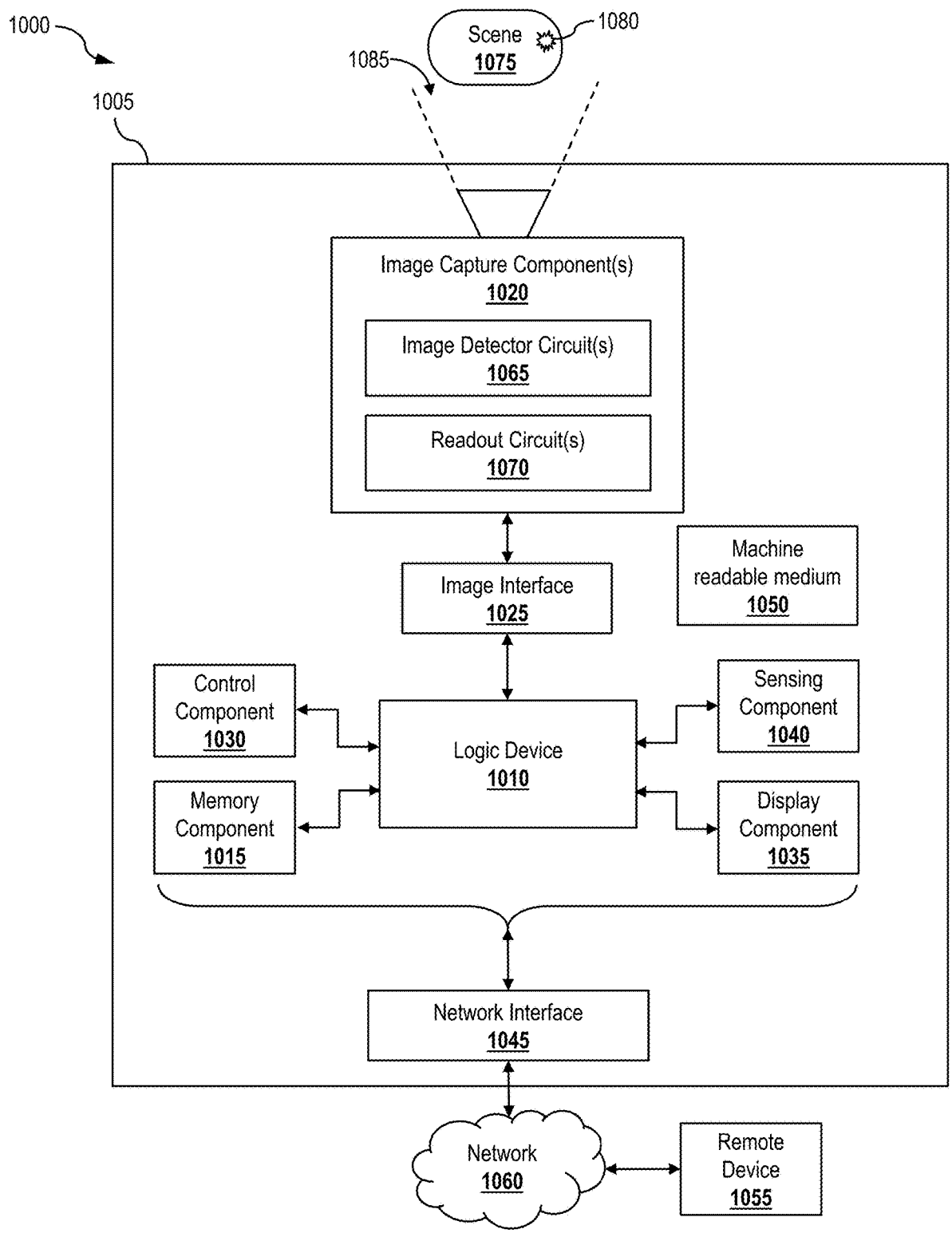
FIG. 10 illustrates a block diagram of an example system in accordance with one or more embodiments of the present disclosure.

FIG. 10 illustrates a block diagram of an example system 1000 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In some embodiments, the system 1000 may include and/or may implement in part the system 100 of FIG. 1.

The system 1000 may be utilized for capturing and processing images in accordance with an embodiment of the disclosure. The system 1000 may represent any type of system that detects one or more ranges (e.g., wavebands) of EM radiation and provides representative data (e.g., one or more still image frames or video image frames). The system 1000 may include an imaging device 1005. By way of non-limiting examples, the imaging device 1005 may be, may include, or may be a part of a tablet computer, a laptop, a personal digital assistant (PDA), a mobile device, a desktop computer, or other electronic device. The imaging device 1005 may include a housing (e.g., a camera body) that at least partially encloses components of the imaging device 1005, such as to facilitate compactness and protection of the imaging device 1005. For example, the solid box labeled 1005 in FIG. 10 may represent a housing of the imaging device 1005. The housing may contain more, fewer, and/or different components of the imaging device 1005 than those depicted within the solid box in FIG. 10. In an embodiment, the system 1000 may include a portable device and may be incorporated, for example, into a wearable apparatus (e.g., helmet, visor, headband) worn by a user, a vehicle, a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the system 1000. In another example, the system 1000 may be coupled via one or more engagement devices to a wearable apparatus worn by a user.

The imaging device 1005 includes, according to one implementation, a logic device 1010, a memory component 1015, an image capture component(s) 1020 (e.g., an imager, an image sensor device), an image interface 1025, a control component 1030, a display component 1035, a sensing component 1040, and/or a network interface 1045. The logic device 1010, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 1010 may be configured, by hardwiring, executing software instructions, or a combination of both, to perform various operations discussed herein for embodiments of the disclosure. The logic device 1010 may be configured to interface and communicate with the various other components (e.g., 1015, 1020, 1025, 1030, 1035, 1040, 1045, etc.) of the imaging system 1000 to perform such operations. In some embodiments, the logic device 1010 may be, may include, or may be a part of the processing device 125 of FIG. 1. The logic device 1010 may be configured to generate light signal assessments based on image data and/or data derived therefrom from the image capture component(s) 1020, store data in the memory component 1015, and/or retrieve stored data from the memory component 1015.

The memory component 1015 includes, in one embodiment, one or more memory devices configured to store data and information, including infrared image data and information. The memory component 1015 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 1010 may be configured to execute software instructions stored in the memory component 1015 so as to perform method and process steps and/or operations. The logic device 1010 and/or the image interface 1025 may be configured to store in the memory component 1015 images or digital image data captured by the image capture component 1020. In some embodiments, the memory component 1015 may include non-volatile memory to store threshold values (e.g., as a basis for comparison to make assessments), calibration data (e.g., used to predict light signal power), and/or other data for facilitating light signal assessment, warning, and/or aperture protection.

In some embodiments, a separate machine-readable medium 1050 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 1050 may be portable and/or located separate from the imaging device 1005, with the stored software instructions and/or data provided to the imaging device 1005 by coupling the machine-readable medium 1050 to the imaging device 1005 and/or by the imaging device 1005 downloading (e.g., via a wired link and/or a wireless link) from the machine-readable medium 1050. It should be appreciated that various modules may be integrated in software and/or hardware as part of the logic device 1010, with code (e.g., software or configuration data) for the modules stored, for example, in the memory component 1015.

The imaging device 1005 may be a video and/or still camera to capture and process images and/or videos of a scene 1075. The scene 1075 may include a light signal 1080. Each image capture component(s) 1020 includes an image detector circuit 1065 (e.g., a visible-light detector circuit, a thermal infrared detector circuit) and a readout circuit 1070 (e.g., an ROIC). The image capture component(s) 1020 may include a visible-light imaging sensor. In some cases, alternatively of in addition to capturing radiation from the visible-light spectrum, the image detector circuit 1065 may include circuitry to capture radiation from one or more other wavebands of the EM spectrum, such as infrared light, ultraviolet light, and so forth. For example, the image capture component 1015 may include an IR imaging sensor (e.g., IR imaging sensor array) configured to detect IR radiation in the near, middle, and/or far IR spectrum and provide IR images (e.g., IR image data or signal) representative of the IR radiation from the scene 1075. For example, the image detector circuit 1065 may capture (e.g., detect, sense) IR radiation with wavelengths in the range from around 700 nm to around 2 mm, or portion thereof. For example, in some aspects, the image detector circuit 1065 may be sensitive to (e.g., better detect) SWIR radiation, MWIR radiation (e.g., EM radiation with wavelength of 2 µm to 5 µm), and/or LWIR radiation (e.g., EM radiation with wavelength of 7 µm to 14 µm), or any desired IR wavelengths (e.g., generally in the 0.7 µm to 14 µm range). In some embodiments, the image capture component(s) 1020 may include a scene-capture imaging device to capture the scene 1075 and a light signal detection device to detect and characterize the light signal 1080. Each of the scene-capture imaging device and the light signal detection device may have an image detector circuit and a readout circuit.

Each image detector circuit 1065 may capture image data associated with the scene 1075. To capture a detector output image, each image detector circuit 1065 may detect image data of the scene 1075 (e.g., in the form of EM radiation) received through an aperture 1085 of the image capture component 1020 and generate pixel values of the image based on the scene 1075. An image may be referred to as a frame or an image frame. In some cases, each image detector circuit 1065 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. The array of detectors may be arranged in rows and columns.

The detector output image may be, or may be considered, a data structure that includes pixels and is a representation of the image data associated with the scene 1075, with each pixel having a pixel value that represents EM radiation emitted or reflected from a portion of the scene 1075 and received by a detector that generates the pixel value. Based on context, a pixel may refer to a detector of the image detector circuit 1065 that generates an associated pixel value or a pixel (e.g., pixel location, pixel coordinate) of the detector output image formed from the generated pixel values. In one example, the detector output image may be a visible-light image. In another example, the detector output image may be an infrared image (e.g., thermal infrared image). For a thermal infrared image (e.g., also referred to as a thermal image), each pixel value of the thermal infrared image may represent a temperature of a corresponding portion of the scene 1075.

In an aspect, the pixel values generated by the image detector circuit 1065 may be represented in terms of digital count values generated based on the electrical signals obtained from converting the detected radiation. For example, in a case that the image detector circuit 1065 includes or is otherwise coupled to an ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 1065 (e.g., an IR image detector circuit) is associated with higher digital count values and higher temperatures.

Each readout circuit 1070 may be utilized as an interface between the image detector circuit 1065 that detects the image data and the logic device 1010 that processes the detected image data as read out by the readout circuit 1070, with communication of data from the readout circuit 1070 to the logic device 1010 facilitated by the image interface 1025. An image capturing frame rate may refer to the rate (e.g., detector output images per second) at which images are detected/output in a sequence by the image detector circuit 1065 and provided to the logic device 1010 by the readout circuit 1070. The readout circuit 1070 may read out the pixel values generated by the image detector circuit 1065 in accordance with an integration time (e.g., also referred to as an integration period). In various embodiments, a combination of the image detector circuit 1065 and the readout circuit 1070 may be, may include, or may together provide an FPA.

In some cases, the image capture component 1020 may include one or more filters adapted to pass radiation of some wavelengths but substantially block radiation of other wavelengths. For example, the image capture component 1020 may be a visible-light imaging device that includes one or more filters adapted to pass visible-light while substantially blocking radiation of other wavelengths. In this example, such filters may be utilized to tailor the image capture component 1020 for increased sensitivity to a desired band of visible-light wavelengths. In some embodiments, the image capture component 1020 may include a visible-light sensor device implemented using a complementary metal oxide semiconductor (CMOS) sensor(s) or a charge-coupled device (CCD) sensor(s). In some cases, other imaging sensors may be embodied in the image capture component 1015 and operated independently or in conjunction with the visible-light sensor device.

In one specific, not-limiting example, the image capture component(s) 1020 may include an IR imaging sensor having an FPA of detectors responsive to IR radiation including NIR, SWIR, MWIR, LWIR, and/or very-long wave IR (VLWIR) radiation, such as for facilitating night vision. Detectors of the image detector circuit 1065 of the image capture component 1020 may be cooled or uncooled. In some aspects, the image detector circuit 1065 may include a thermal image detector circuit that includes an array of microbolometers, and the combination of the image detector circuit 1065 and the readout circuit 1070 may be referred to as a microbolometer FPA. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide (VOX), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers. In some cases, a microbolometer may be sensitive to at least the LWIR range.

The images, or the digital image data corresponding to the images, provided by the image capture component(s) 1020 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images before being applied to the images.

The image interface 1025 may include, in some embodiments, appropriate input ports, connectors, switches, and/or circuitry configured to interface with external devices (e.g., a remote device 1055 and/or other devices) to receive images (e.g., digital image data) generated by or otherwise stored at the external devices. In an aspect, the image interface 1025 may include a serial interface and telemetry line for providing metadata associated with image data. The received images or image data may be provided to the logic device 1010. In this regard, the received images or image data may be converted into signals or data suitable for processing by the logic device 1010. For example, in one embodiment, the image interface 1025 may be configured to receive analog video data and convert it into suitable digital data to be provided to the logic device 1010.

The image interface 1025 may include various standard video ports, which may be connected to a video player, a video camera, or other devices capable of generating standard video signals, and may convert the received video signals into digital video/image data suitable for processing by the logic device 1010. In some embodiments, the image interface 1025 may also be configured to interface with and receive images (e.g., image data) from the image capture component 1020. In other embodiments, the image capture component 1020 may interface directly with the logic device 1010.

The control component 1030 includes, in one embodiment, a user input and/or an interface device, such as a rotatable knob (e.g., potentiometer), push buttons, slide bar, keyboard, and/or other devices, that is adapted to generate a user input control signal. The logic device 1010 may be configured to sense control input signals from a user via the control component 1030 and respond to any sensed control input signals received therefrom. The logic device 1010 may be configured to interpret such a control input signal as a value, as generally understood by one skilled in the art. In one embodiment, the control component 1030 may include a control unit (e.g., a wired or wireless handheld control unit) having push buttons adapted to interface with a user and receive user input control values. In one implementation, the push buttons and/or other input mechanisms of the control unit may be used to control various functions of the imaging device 115, such as calibration initiation and/or related control, shutter control, autofocus, menu enable and selection, field of view, brightness, contrast, noise filtering, image enhancement, and/or various other features.

The display component 1035 includes, in one embodiment, an image display device (e.g., a liquid crystal display (LCD)) or various other types of generally known video displays or monitors. The logic device 1010 may be configured to display image data and information on the display component 1035. The logic device 1010 may be configured to retrieve image data and information from the memory component 1015 and display any retrieved image data and information on the display component 1035. The display component 1035 may include display circuitry, which may be utilized by the logic device 1010 to display image data and information. The display component 1035 may be adapted to receive image data and information directly from the image capture component 1020, logic device 1010, and/or image interface 1025, or the image data and information may be transferred from the memory component 1015 via the logic device 1010. In some aspects, the control component 1030 may be implemented as part of the display component 1035. For example, a touchscreen of the imaging device 1005 may provide both the control component 1030 (e.g., for receiving user input via taps and/or other gestures) and the display component 1035 of the imaging device 1005.

The sensing component 1040 includes, in one embodiment, one or more sensors of various types, depending on the application or implementation requirements, as would be understood by one skilled in the art. Sensors of the sensing component 1040 provide data and/or information to at least the logic device 1010. In one aspect, the logic device 1010 may be configured to communicate with the sensing component 1040. In various implementations, the sensing component 1040 may provide information regarding environmental conditions, such as outside temperature (e.g., ambient temperature), lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 1040 may represent conventional sensors as generally known by one skilled in the art for monitoring various conditions (e.g., environmental conditions) that may have an effect (e.g., on the image appearance) on the image data provided by the image capture component 1020.

In some implementations, the sensing component 1040 (e.g., one or more sensors) may include devices that relay information to the logic device 1010 via wired and/or wireless communication. For example, the sensing component 1040 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 1010 can use the information (e.g., sensing data) retrieved from the sensing component 1040 to modify a configuration of the image capture component 1020 (e.g., adjusting a light sensitivity level, adjusting a direction or angle of the image capture component 1020, adjusting an aperture, etc.). The sensing component 1040 may include a temperature sensing component to provide temperature data (e.g., one or more measured temperature values) various components of the imaging device 1005, such as the image detection circuit 1065. By way of non-limiting examples, a temperature sensor may include a thermistor, thermocouple, thermopile, pyrometer, and/or other appropriate sensor for providing temperature data.

In some embodiments, various components of the imaging system 1000 may be distributed and in communication with one another over a network 1060. In this regard, the imaging device 1005 may include a network interface 1045 configured to facilitate wired and/or wireless communication among various components of the imaging system 1000 over the network 1060. In such embodiments, components may also be replicated if desired for particular applications of the imaging system 1000. That is, components configured for same or similar operations may be distributed over a network. Further, all or part of any one of the various components may be implemented using appropriate components of the remote device 1055 (e.g., a conventional digital video recorder (DVR), a computer configured for image processing, and/or other device) in communication with various components of the imaging system 1000 via the network interface 1045 over the network 1060, if desired. Thus, for example, all or part of the logic device 1010, all or part of the memory component 1015, and/or all of part of the display component 1035 may be implemented or replicated at the remote device 1055. In some embodiments, the remote device 1055 may represent one or more systems, such as the alert system 165 and/or the aperture protection system 170. It will be appreciated that many other combinations of distributed implementations of the imaging system 1000 are possible, without departing from the scope and spirit of the disclosure.

Furthermore, in various embodiments, various components of the imaging system 1000 may be combined and/or implemented or not, as desired or depending on the application or requirements. In one example, the logic device 1010 may be combined with the memory component 1015, image capture component 1020, image interface 1025, display component 1035, sensing component 1040, and/or network interface 1045. In another example, the logic device 1010 may be combined with the image capture component 1020, such that certain functions of the logic device 1010 are performed by circuitry (e.g., a processor, a microprocessor, a logic device, a microcontroller, etc.) within the image capture component 1020. In another example, the imaging system 1000 does not include the sensing component 1040.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A light signal assessment device comprising:
    a light signal detection device comprising:
        a filter array configured to filter a light signal incident on the filter array to obtain a filtered light signal;
        a detector array configured to receive the filtered light signal and generate a light signal detection image based on the filtered light signal; and
        a measurement device configured to determine a characteristic associated with the light signal based on the light signal detection image;
    a logic device configured to:
        generate an output based on the characteristic, wherein the output comprises an assessment value for association with the light signal generated based on the characteristic; and
        generate a control signal based on the assessment value; and
    an imaging device configured to capture a scene image that encompasses the light signal in response to the control signal to provide scene context.

2. The light signal assessment device of claim 1, wherein the output further comprises the light signal detection image with an overlay on the light signal detection image, and wherein the overlay is indicative of the characteristic.

3. The light signal assessment device of claim 1, wherein:
    the characteristic comprises a direction of arrival associated with the light signal;
    the measurement device is configured to:
        identify, in the light signal detection image, a cluster of pixels associated with the light signal based on a power threshold;
        determine a centroid associated with the cluster of pixels; and
        determine the direction of arrival associated with the light signal based on the centroid.

4. A light signal assessment device comprising:
    a light signal detection device comprising:
        a filter array configured to filter a light signal incident on the filter array to obtain a filtered light signal;
        a detector array configured to receive the filtered light signal and generate a light signal detection image based on the filtered light signal; and
        a measurement device configured to:
            identify, in the light signal detection image, a cluster of pixels associated with the light signal based on a power threshold, wherein the power threshold is wavelength dependent;
            determine a centroid associated with the cluster of pixels;
            determine a characteristic associated with the light signal based on the light signal detection image, wherein the characteristic comprises a direction of arrival associated with the light signal determined based on the centroid; and
            track a location of the light signal in a scene over a plurality of frames based on the centroid in the light signal detection image and a respective centroid associated with the light signal in each of the plurality of frames; and
    a logic device configured to generate an output based on the characteristic.

5. The light signal assessment device of claim 4, further comprising an imaging device configured to capture a scene image that encompasses the light signal.

6. The light signal assessment device of claim 5, wherein the output comprises an assessment value for association with the light signal generated based on the direction of arrival;
    the logic device is further configured to generate a control signal based on the assessment value; and
    the imaging device is configured to capture the scene image in response to the control signal.

7. The light signal assessment device of claim 1, wherein:
    the characteristic comprises a power value associated with the light signal;
    the logic device is further configured to compare the power value with at least one power threshold; and
    the assessment value is based on a comparison of the power value with the at least one power threshold.

8. The light signal assessment device of claim 1, wherein the output further comprises a combined image based on the scene image and the characteristic.

9. The light signal assessment device of claim 8, wherein the combined image comprises the scene image with an overlay on the scene image, wherein the overlay is indicative of the characteristic.

10. The light signal assessment device of claim 1, wherein the detector array is further configured to generate a plurality of additional light signal detection images associated with different exposure times and/or different gains to increase a dynamic range associated with the detector array and/or prevent saturation, wherein the light signal detection image and each of the additional light signal detection images is associated with a respective exposure time and a respective gain, wherein the characteristic is further based on the plurality of additional light signal detection images, and wherein the characteristic comprises a wavelength associated with the light signal, a location associated with the light signal, a direction of arrival associated with the light signal, and/or a power associated with the light signal, and wherein the wavelength associated with the light signal is a visible-light wavelength or a near-infrared wavelength.

11. The light signal assessment device of claim 1, wherein:
the filter array comprises a plurality of filters, wherein each filter of the plurality of filters is associated with a respective passband, and wherein each filter of at least a subset of the plurality of filters is configured to filter a respective portion of the light signal incident on the filter according to the respective passband to obtain a respective portion of the filtered light signal;
the detector array comprises a plurality of detectors, wherein each detector of the plurality of detectors is associated with a respective one of the plurality of filters, and wherein each detector of at least a subset of the plurality of detectors is configured to receive the respective portion of the filtered light signal from the respective one of the plurality of filters and generate a pixel value based on the respective portion of the filtered light signal; and
the characteristic associated with the light signal is based on the pixel values generated by the subset of the plurality of detectors.

12. The light signal assessment device of claim 11, wherein the filter array comprises a plurality of sets of contiguous filters, wherein each set of contiguous filters comprises a respective subset of the plurality of filters, wherein, for each set of contiguous filters, each filter of the set of contiguous filters is associated with a different passband from remaining filters of the set of contiguous filters, wherein the characteristic comprises a wavelength associated with the light signal, and wherein the measurement device is configured to determine the wavelength based on the pixel values associated with each set of contiguous filters.

13. The light signal assessment device of claim 11, wherein the light signal detection device further comprises an optical element configured to increase a size of the light signal to provide an expanded light signal, wherein the filter array is configured to filter the expanded light signal to obtain the filtered light signal, and wherein the optical element comprises a lens, a diffusive film, and/or a diffractive film.

14. A system comprising the light signal assessment device of claim 1, the system further comprising:
an alert device configured to:
receive the output from the logic device; and
generate an alert based on the output, wherein the alert comprises a visual alert, an audible alert, and/or a tactile alert; and/or
an aperture protection device configured to selectively block the light signal based on the output.

15. A method comprising:
filtering, by a filter array, a light signal incident on the filter array to obtain a filtered light signal;
generating, by a detector array, a light signal detection image based on the filtered light signal;
generating, by the detector array, a plurality of additional light signal detection images associated with different exposure times and/or different gains to increase a dynamic range associated with the detector array and/or prevent saturation, wherein the light signal detection image and each of the additional light signal detection images is associated with a respective exposure time and a respective gain;
determining a characteristic associated with the light signal based on the light signal detection image and the plurality of additional light signal detection images, wherein the characteristic comprises a power value associated with the light signal;
comparing the power value with at least one power threshold;
capturing a scene image that encompasses the light signal; and
generating an output based on the characteristic, wherein the output comprises an assessment value for association with the light signal generated based on the characteristic and a combined image generated based on the scene image and the characteristic, and wherein the assessment value is based on a comparison of the power value with the at least one power threshold.

16. The method of claim 15, wherein the output further comprises the light signal detection image with an overlay on the light signal detection image, and wherein the overlay is indicative of the characteristic.

17. The method of claim 15, further comprising:
generating a control signal based on the assessment value, wherein the capturing the scene image is performed by an imaging device in response to the control signal; and
displaying the combined image, wherein the combined image comprises the scene image with an overlay on the scene image, wherein the overlay is indicative of the characteristic and/or the assessment value, and wherein the characteristic further comprises a wavelength associated with the light signal, a location associated with the light signal, and/or a direction of arrival associated with the light signal.

18. The method of claim 15, wherein the characteristic further comprises a direction of arrival associated with the light signal, the method further comprising:
identifying, in the light signal detection image, a cluster of pixels associated with the light signal based on the at least one power threshold;
determining a centroid associated with the cluster of pixels, wherein the direction of arrival associated with the light signal is based on the centroid; and
tracking a location of the light signal in a scene over a plurality of frames based on the centroid in the light signal detection image and a respective centroid associated with the light signal in each of the plurality of frames.

19. The method of claim 15, wherein:
the filter array comprises a plurality of filters, wherein each filter of the plurality of filters is associated with a respective passband;
the detector array comprises a plurality of detectors, wherein each detector of the plurality of detectors is associated with a respective one of the plurality of filters;
the filtering comprises filtering, by each filter of at least a subset of the plurality of filters, a respective portion of the light signal incident on the filter according to the respective passband to obtain a respective portion of the filtered light signal;

the generating the light signal detection image comprises generating, by each detector of at least a subset of the plurality of detectors, a pixel value of the light signal detection image based on the respective portion of the filtered light signal; and the characteristic associated with the light signal is based on the pixel values generated by the subset of the plurality of detectors.

20. The method of claim 15, further comprising increasing a size of the light signal to provide an expanded light signal, wherein the filtering is performed by the filter array on the expanded light signal.

* * * * *

UNITED STATES PATENT AND TRADEMARK OFFICE
CERTIFICATE OF CORRECTION

| | |
|---|---|
| PATENT NO. | : 12,198,355 B2 |
| APPLICATION NO. | : 17/879715 |
| DATED | : January 14, 2025 |
| INVENTOR(S) | : Milind P. Mahajan et al. |

Page 1 of 1

It is certified that error appears in the above-identified patent and that said Letters Patent is hereby corrected as shown below:

In the Specification

Column 30, Line 33, change "vanadium oxide (VOX)," to --vanadium oxide ($VO_x$),--.

Signed and Sealed this
Fourth Day of March, 2025

Coke Morgan Stewart
*Acting Director of the United States Patent and Trademark Office*